(12) United States Patent
Tani et al.

(10) Patent No.: US 7,710,068 B2
(45) Date of Patent: May 4, 2010

(54) ELECTRICAL POWER SUPPLY SYSTEM FOR MOTOR VEHICLE

(75) Inventors: Keisuke Tani, Kariya (JP); Kazuyoshi Obayashi, Chita-gun (JP); Takashi Senda, Toyota (JP); Yukihiro Yamashita, Takahama (JP); Daisuke Kuroda, Kariya (JP)

(73) Assignee: Denso Corporation, Kariya (JP)

( * ) Notice: Subject to any disclaimer, the term of this patent is extended or adjusted under 35 U.S.C. 154(b) by 498 days.

(21) Appl. No.: 11/808,089

(22) Filed: Jun. 6, 2007

(65) Prior Publication Data

US 2008/0157539 A1 Jul. 3, 2008

(30) Foreign Application Priority Data

Jun. 6, 2006 (JP) ............................. 2006-156745

(51) Int. Cl.
   *H02J 7/14* (2006.01)
   *H02J 7/00* (2006.01)
   *H02J 1/10* (2006.01)
   *B60L 11/00* (2006.01)
   *F02D 29/06* (2006.01)
   *F02D 35/00* (2006.01)

(52) U.S. Cl. ..................... 320/104; 320/134; 290/40 C; 701/22; 322/25

(58) Field of Classification Search ................. 320/102, 320/103, 104, 128, 134; 290/40 A, 40 B, 290/40 C; 322/7, 25; 903/903, 904, 905, 903/906, 907; 307/9.1, 10.1, 10.7, 11, 18, 307/19, 20, 21, 22, 66; 318/139, 801; 701/22; 702/63, 64; 180/65.3

See application file for complete search history.

(56) References Cited

U.S. PATENT DOCUMENTS

| 6,422,972 | B1 * | 7/2002 | Eguchi ........................ 477/107 |
| 6,625,525 | B2 * | 9/2003 | Yoshino et al. ................ 701/22 |
| 6,700,214 | B2 * | 3/2004 | Ulinski et al. ............. 290/40 C |
| 2004/0164616 | A1 | 8/2004 | Obayashi et al. |
| 2006/0271257 | A1 | 11/2006 | Kuroda et al. |

FOREIGN PATENT DOCUMENTS

| JP | A 2004-260908 | 9/2004 |
| JP | A 2006-335097 | 12/2006 |
| KR | 2000-0009447 | 2/2000 |

\* cited by examiner

*Primary Examiner*—Patrick J Assouad
*Assistant Examiner*—M'Baye Diao
(74) *Attorney, Agent, or Firm*—Oliff & Berridge, PLC

(57) ABSTRACT

A power supply control apparatus for controlling an electric generator of a vehicle limits the rate of change of a power supply voltage to a predetermined variation rate range, when the change is caused by operations to control the charge condition of the vehicle battery, and controls the generated power to match the drive torque applied by the engine to the generator. When the electrical load demand changes, the generated power is controlled to limit a resultant momentary change in the power supply voltage caused by an engine response delay, while minimizing a resultant momentary amount of engine speed variation.

20 Claims, 18 Drawing Sheets (a) $W = I \cdot V$
$V = R \cdot I + V0$ (b) $dWu = dVu \cdot I + \dfrac{dVu \cdot V}{r}$ (a) CURRENT $I-\Delta II$ ↓  POWER $W-\Delta WI$ ↓  VOLTAGE $V-\Delta VI$ INTERNAL RESISTANCE $r$ $V_0$ $\Delta WI = VI - (V+\Delta VI) \times (I+\Delta II)$
$\Delta I = \Delta VI/r$ (b) $\Delta WI = \Delta VI \cdot I + \dfrac{\Delta VI^2}{r} + \dfrac{\Delta VI \cdot V}{r}$

ELECTRICAL POWER SUPPLY SYSTEM FOR MOTOR VEHICLE

CROSS-REFERENCE TO RELATED APPLICATIONS

This application is based on and incorporates herein by reference Japanese Patent First Application No. 2006-156745 filed on Jun. 6, 2006.

BACKGROUND OF THE INVENTION

1. Field of Application

The present invention relates to an electrical power supply system (referred to in the following simply as a power supply system) installed in a motor vehicle, for regulating the electrical power produced from an electric generator that is driven by the vehicle engine.

2. Description of Related Art

Due to the increased amount of electrical equipment installed in motor vehicles in recent years, with an accompanying increase in the level of electrical power that must be generated for operating such equipment, it is becoming necessary for the engine-driven electric generator of a vehicle to produce a higher level of electrical power. A correspondingly higher level of torque must be applied by the engine to the electric generator, to effect an increase in electrical power output, and this results in an increase in the engine fuel consumption. It would be desirable to reduce the extent of such increased fuel consumption.

In the prior art, as a technique for reducing engine fuel consumption, the costs of generating electrical power under various operating conditions are calculated, and electrical power generation is concentrated on periods when the cost is low. Such a technique has been proposed for example in Japanese patent publication No. 2004-260908 (pages 8 to 13, FIGS. 1 to 8), referred to in the following as reference document 1.

However with the method described in reference document 1, the variations in the generated electrical power may be greater and occur more frequently than those which occur with a conventional type of voltage regulation, so that the problem arises that the power supply voltage (i.e., which is both the generator output voltage and the voltage of the vehicle battery) may vary rapidly, with large-scale fluctuations. As a result, the power supplied to electrical equipment such as the vehicle headlamps will fluctuate. Problems such as flickering of the headlamps may thereby occur, which can be annoying to the vehicle driver.

Furthermore, due to such large-scale variations in electric generator output power, the level of engine torque that is absorbed by the generator will vary significantly. In particular, when there is a sudden large increase in the torque load on the engine within a short period of time, a substantial lowering of the engine speed may occur. Hence the problem arises that momentary deceleration or acceleration of the vehicle may occur due to changes in the load torque on the engine that result from operations to control the state of charge of the battery to a suitable level, i.e., performed during periods when battery charging can be performed with minimized fuel consumption.

This may cause annoyance to the vehicle driver. In addition, lowering of the engine speed over a long period of time, with insufficient power being thereby produced by the generator, may cause problems with the operation of vehicle equipment.

Furthermore, with prior art types of power supply control apparatus for an electric generator of a vehicle, changes in the load power demand (i.e., amount of power consumed by electrical loads) can result in momentary changes in the power supply voltage, while the resultant variations in the torque load on the engine can result in changes in the engine speed, causing momentary acceleration or deceleration of the vehicle.

SUMMARY OF THE INVENTION

It is an objective of the present invention to overcome the above problems by providing a vehicle-use power supply system whereby amounts of change that occur in the power supply voltage of the system, as a result of changes made in the level of power supplied to or discharged from the vehicle battery, can be limited to be within a predetermined range, while in addition the rate at which such a change in voltage occurs can be limited to be within a predetermined range of variation rate.

As a result, charging/discharging of the battery can be optimally controlled to ensure that charging to maintain the battery at a sufficient level of charge is performed economically, with reduced fuel consumption, while also ensuring that problems such as momentary variations in engine speed (resulting from such battery charging control operations) can be minimized.

In addition, amounts of change that occur in the power supply voltage due to sudden changes in electrical load demand and a delay in altering the drive torque supplied from the engine in response to such changes in load demand, can be limited to be within a predetermined range, while also ensuring that momentary variations in engine speed due to such change in load demand are minimized.

To achieve the above objectives, the invention provides a vehicle-use power supply system comprising a battery for supplying electrical power to an electrical load via a power supply bus, an electric generator for supplying electrical power via the bus to the battery and the electrical load, and a power supply control apparatus for controlling the power produced by the generator, in which circuitry of the power supply control apparatus applies control to maintain the generated power at a value for:

(a) holding the charge/discharge power of the battery within a range of values of power whereby the power supply voltage (appearing on the power supply bus) is held within a predetermined permissible range of voltages, while also (b) holding the rate of variation of the charge/discharge power within a range of values of power variation rate whereby the rate of variation of the power supply voltage is held within a predetermined permissible range of variation rates.

The term "charge/discharge power" as used in the following description and in the appended claims is to be understood as signifying the amount of power that is currently being supplied to a battery (i.e., when a charging current is being supplied to battery) or the amount of power that is currently being discharged from the battery. The charge/discharge power value is equal to the difference between the power being produced by the electrical generator and the power being supplied to the electrical load.

Hence, in the following description and in the appended claims, the term "increase in the charge/discharge power level" is to be understood as signifying a change that may be either an increase in the charging power or a decrease in the discharge power of the battery. Similarly, a "decrease in the charge/discharge power level" is to be understood as signifying a change that may be either a decrease in the charging power or an increase in the discharge power.

As a result, the power supply voltage can be held within a predetermined range of values, when changes are made in the charge/discharge power, while also ensuring that these changes in the charge/discharge power will not cause abrupt variations in the power supply voltage. Hence, problems such as flickering of the vehicle headlamps as a result of the battery charging/discharging control operations can be reduced, since only gradual changes in the power supply voltage will occur.

With such a system, the permissible range of charge/discharge power variation the charge/discharge power is obtained based on calculating the internal resistance of the battery, and calculating values defining the permissible range of charge/discharge power variation based upon that internal resistance value in conjunction with currently detected values of the power supply voltage (i.e., battery voltage) and battery current.

In that way, the relationship between the rate of variation of the charge/discharge power level of the battery and a corresponding rate of variation of the power supply voltage can be accurately calculated, based on the actual operating status of the battery.

The invention is applicable to an electric generator that is driven by a vehicle engine, with the system of the invention including an engine control apparatus for controlling the engine, and in which the power supply control apparatus:

derives a generator distributed power value as a level of power to be currently generated by the electric generator, based upon factors including the status of the electrical load and state of charge of the battery;

applies compensation to the generator distributed power value to maintain the rate of variation of the charge/discharge power of the battery within the permissible range of charge/discharge power variation, and sets a resultant compensated generator distributed power value as a generated power demand value; and transmits, to the engine control apparatus, a demand value of torque to be produced by the engine for driving the electric generator to produce the generated power demand value.

In response, the engine control apparatus:

controls the engine to initiate an engine operating condition for producing the demand value of torque for driving the generator (i.e., in addition to the torque that is being applied to drive the vehicle);

calculates the available value of torque that can currently be provided by the engine for driving the electric generator; and transmits data expressing the available value of torque to the power supply control apparatus.

In response, the power supply control apparatus controls the generated power to a level whereby, at each point in time, the torque absorbed by the generator corresponds to the available torque.

It should be noted that the term "available torque" is used in this specification and in the appended claims with a specific meaning. "Available torque" as used herein signifies a torque amount which, if set as the amount of torque absorbed by the electric generator at the current point in time, will not cause a change in the engine speed. The amount of torque absorbed by the electric generator is determined by the level of power that the generator is currently producing. The available torque value is calculated by the engine control apparatus based upon factors including the control response delay of the engine.

When there is a sudden change in the power that must be produced by the electric generator, e.g., when charging of the battery is started, and commands are transmitted for controlling the engine to correspondingly change the amount of torque that is being provided for driving the electric generator, there will be certain amount of delay (the aforementioned control response delay) before the engine actually completes the designated change in torque. Hence if the electric generator were to be controlled to immediately change its generated output power to match the change in demand, the resultant increase or decrease in load torque on the engine would cause the engine speed to be momentarily reduced or increased, thereby momentarily decelerating or accelerating the vehicle.

However with the above aspect of the invention, it is ensured that the level of torque absorbed by the electric generator is kept substantially matched to the actual level of torque that is currently being produced by the engine for driving the generator (in addition to the torque applied to drive the vehicle), irrespective of the engine control response delay.

Hence, the problem of momentary variations in the engine speed due to changes in the generated power demand (i.e., changes that are caused by operations to control of the charge/discharge power for maintaining the battery in an optimum condition) can thus be substantially overcome.

Specifically, the electric generator control apparatus performs a calculation to convert the available value of torque to a corresponding value of available generated power, detects the difference between the available value of generated power and the generated power demand value, calculates a generated power command value whereby the difference will be reduced, and controls the generator to produce that command value of generated power.

The term "available generated power" is used in this specification and in the appended claims with a specific meaning. "Available generated power", as used herein, signifies a value of generated power which, if set as the value produced by the electric generator at the current point in time, will be matched to the available torque, i.e., will not cause a change in the engine speed.

From another aspect, the power supply control apparatus can be configured to detect a condition in which the charge/discharge power level is changing while the load power demand remains constant, and, when the condition is detected, apply compensation to the generated power command value by feedback control to maintain the rate of variation of the power supply voltage within the permissible range of voltage variation rate.

In that way, even if there are errors in the values used to define the permissible range of charge/discharge power variation (for example, due to an error in the calculated internal resistance value of the battery), the effects of these errors can be compensated, by comparing the actual rate of variation of the power supply voltage with predetermined maximum allowable rates of increase and decrease, and adjusting the generated power accordingly.

From another aspect, the invention provides an electrical power control apparatus that sets the level of generated electrical power or the level of power consumed by the electrical load (or both of these) based upon a first range of values and a second range of values, where:

the first range is a permissible range of variation of charge/discharge power, corresponding to a permissible range of variation of the power supply voltage under a condition of unchanged load power demand, and the second range is a range of variation of the charge/discharge power whereby an amount of momentary variation of the power supply voltage is held within a predetermined permissible range of variation, when the power supply voltage variation occurs under a condition of change of load power demand and results from a delay in adjusting the drive torque applied to the electric generator (i.e., due to the aforementioned engine control response delay) in response to the change in load power demand.

In that way, when for example there is a sudden increase in the load power demand and this causes a momentary insufficiency of generated electrical power and hence power is discharged from the battery (i.e., the charge/discharge power is reduced) it becomes possible to temporarily reduce the level of electrical power that is generated during the interval of insufficiency (thereby temporarily reducing the torque load on the engine), to thereby reduce the amount of lowering of the engine speed while also limiting the amount of decrease of the power supply voltage that is caused by the temporary insufficiency of generated power.

DESCRIPTION OF PREFERRED EMBODIMENTS

First Embodiment

Figure 1:
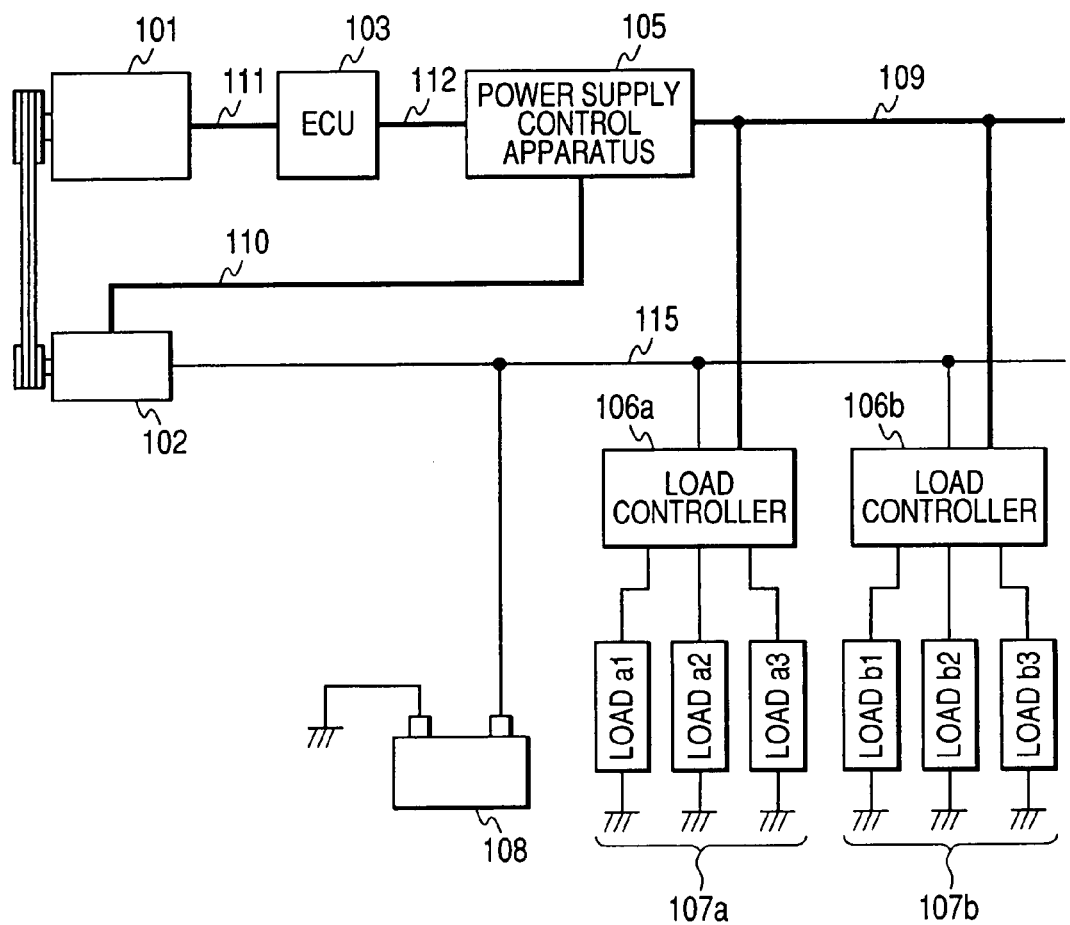
FIG. 1 shows the overall configuration of a first embodiment of a vehicle-use power supply system.

FIG. 1 shows the overall configuration of a first embodiment of a vehicle-use power supply system. As shown, the system includes an engine 101, an electric generator 102, an engine control unit (abbreviated to ECU in the following) 103, a power supply control apparatus 105, load control apparatuses 106a and 106b, and a battery (i.e., electrical storage battery) 108.

The electric generator (referred to in the following simply as the generator) 102 is driven for rotation by the engine 101, and supplies operating power to electrical loads 107a, 107b while also supplying electrical power to charge the battery 108. The power supply control apparatus 105 is connected to the generator 102, and to the load control apparatuses 106a and 106b which are respective controllers of the power supplied to the loads 107a and 107b. Information sent from the load control apparatuses 106a, 106b specifying the total amount of power that is currently required by the loads 107a, 107b will be referred to in the following as the load power demand. The power supply control apparatus 105 controls the output power produced from the generator 102, for supplying the electrical loads 107a, 107b in accordance with the load power demand while also monitoring the status of the battery 108 and supplying charging power to the battery 108 if necessary. The power supply control apparatus 105 thus calculates the amount of electric power that must be generated, at each point in time, and regulates the generated output of the generator 102 accordingly.

The generator 102, the battery 108, and the load control apparatuses 106a, 106B (which respectively control the supplying of power to the electrical loads 107a, 107b) are connected in common to a power supply bus 115. Communication lines 109, 110, 111, and 112 are provided for performing serial data communication between the various apparatus units of the system, via a network such as a CAN (controller area network).

Figure 2:
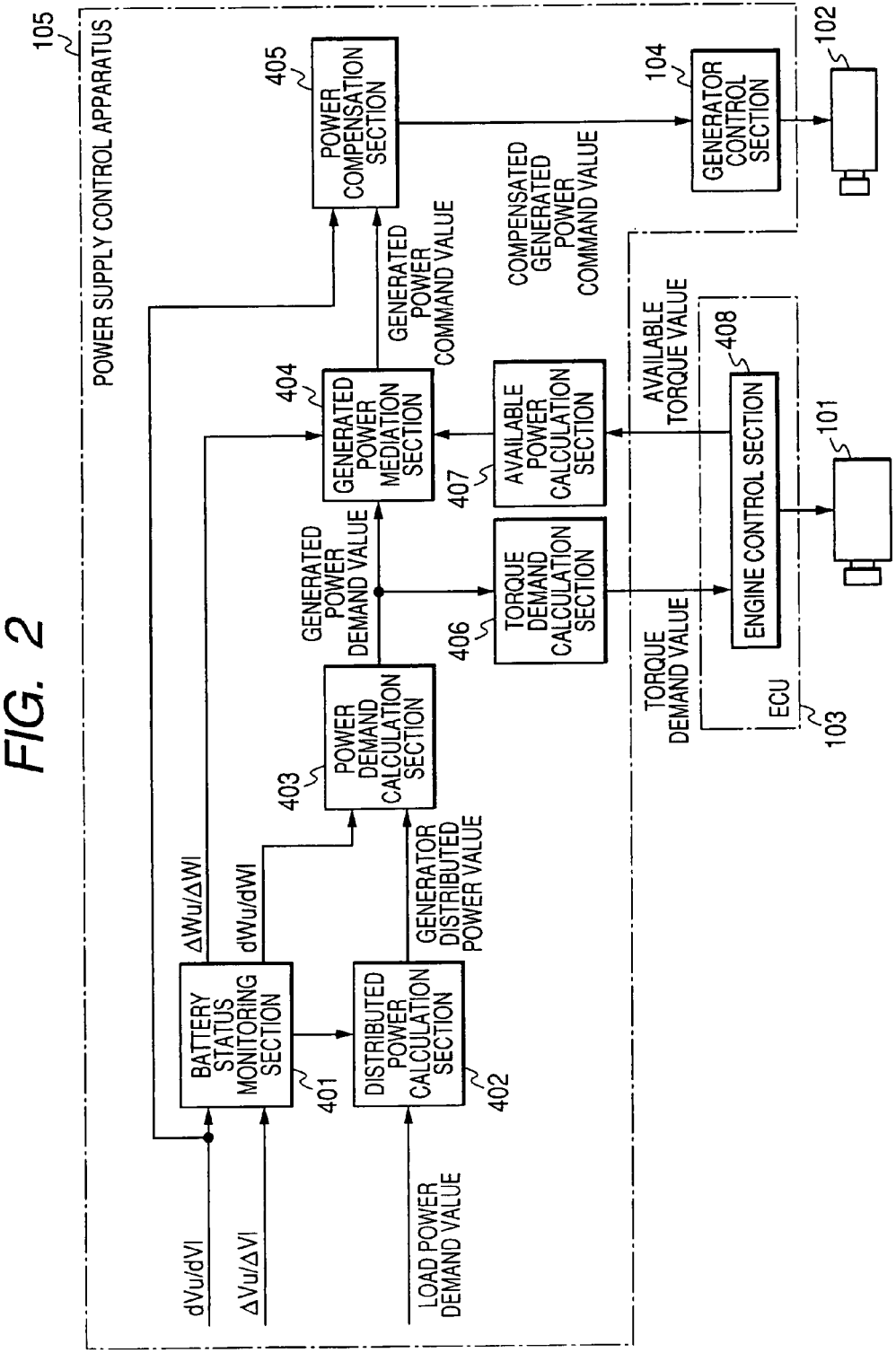
FIG. 2 shows details of a power supply apparatus in the first embodiment.

The circuitry that constitutes the power supply control apparatus 105 can be based on a microcomputer, or a combination of a microcomputer and hardware circuits, with the microcomputer operating under an appropriate control program to perform various functions that are described in the following, through periodic execution of a processing routine. However for ease of understanding, these functions will be described as being executed by plurality of interconnected processing sections, shown in the system block diagram of FIG. 2

Here, the power supply control apparatus 105 is made up of a battery status acquisition section 401, a distributed power calculation section 402, a power demand calculation section 403, a power generation mediation section 404, a power compensation section 405, a torque demand value calculation section 406 a available power value calculation section 407 and a generator control section 104, whose respective functions will be described in the following.

Figure 3:
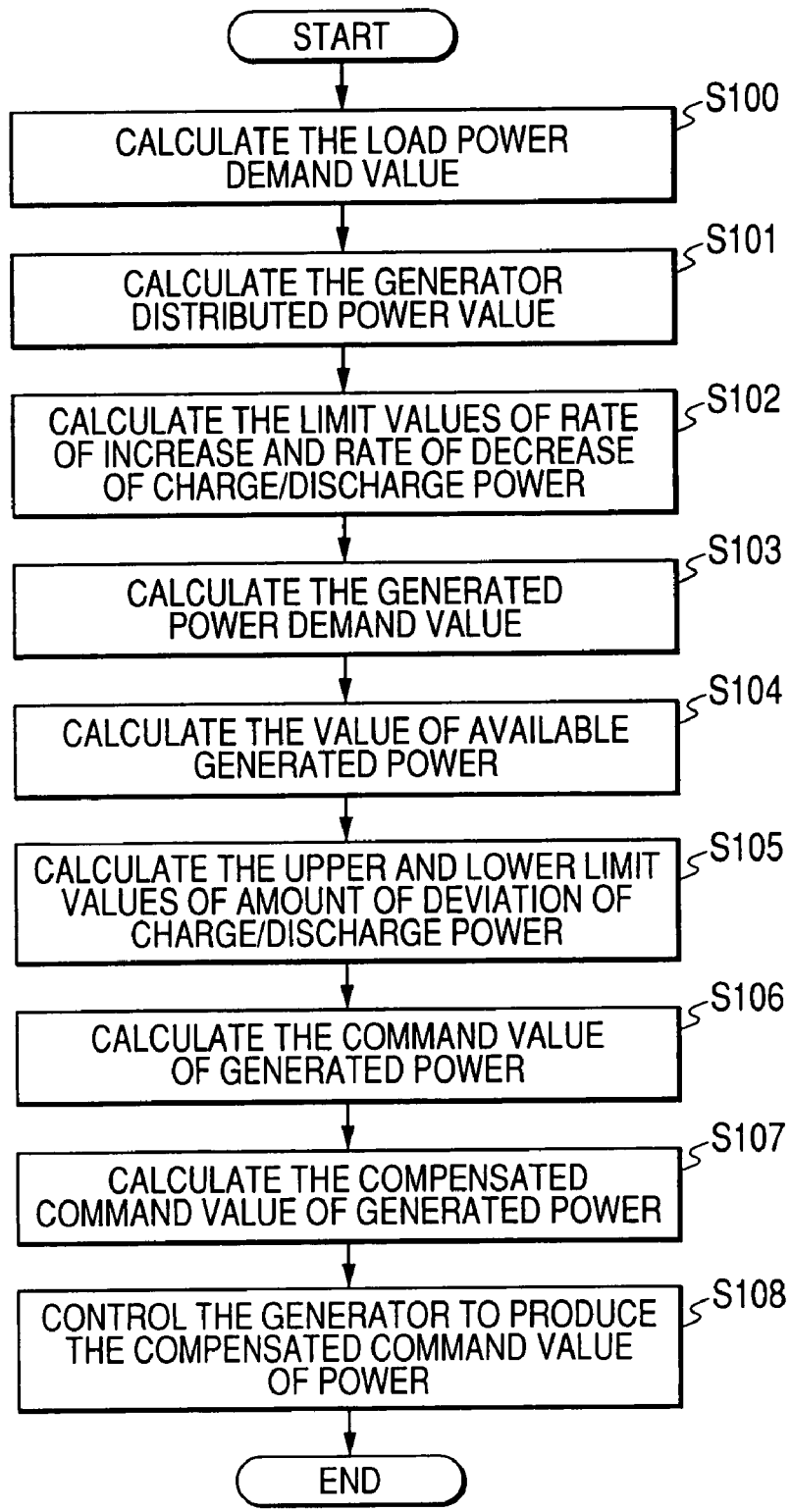
FIG. 3 is a flow diagram of an operation sequence executed by the vehicle-use power supply system of the first embodiment.

FIG. 3 is a flow diagram showing an operation sequence that is repetitively executed by the system for controlling electric power generation. These operations are mainly executed by the power supply control apparatus 105, however they also involve the ECU 103, as described hereinafter Firstly, (step S100) the power supply control apparatus 105 acquires the value of load power demand that is currently required by the electrical loads 107a, 107b.

Next, (step S101) the distributed power calculation section 402 of the power supply control apparatus 105 derives the optimum value of charge/discharge power (where "charge/discharge power" has the significance defined hereinabove) for the battery 108. This optimum value is derived based on information (sent from the load control apparatuses 106a and 106b) indicating the conditions of the electrical loads 107a, 107b, and information on the condition of the battery 108, received from the battery status acquisition section 401.

Based on the optimum charge/discharge power value and the load power demand, the distributed power calculation section 402 calculates the total amount of power that is currently required to be generated by the generator 102. That total amount of power is referred to in the following as the generator distributed power, and is calculated to be within a range of values of power that can currently be produced by the generator 102 and to enable the charge/discharge power to be close to optimum as possible.

Specifically, the generator distributed power value is determined such as to achieve a charge/discharge power level of the battery 108 whereby the voltage of the battery 108 is held within a range between predetermined maximum and a minimum voltage values. That range of charge/discharge power levels is referred to in the following as the No. 1 range, i.e., representing a permissible range of variation of the charge/discharge power.

Figure 4:
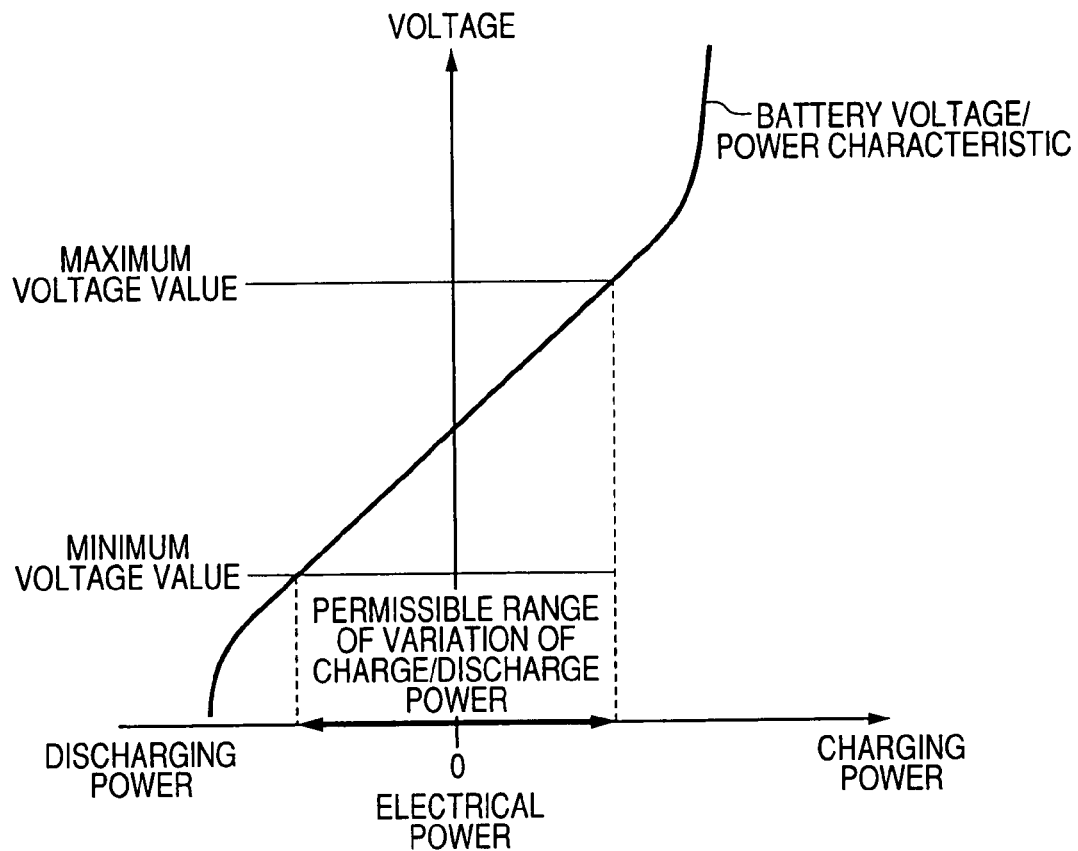
FIG. 4 is a diagram showing an example of a battery voltage/power characteristic.

FIG. 4 is an example of the power/voltage operating characteristic of the battery 108, illustrating the No. 1 range, with values of charge/discharge power plotted along the horizontal axis and values of voltage of the battery 108 (i.e., power supply voltage) along the vertical axis.

Next (step S102) the battery status acquisition section 401 derives a limit value of the rate of increase of the charge/discharge power level of the battery 108 (referred to in the following as the charge/discharge power increase rate limit dWu, measured in units of W/s). This is a value whereby the rate of increase of the power supply voltage appearing on the power supply bus 115 is held to within a specific maximum value (referred to in the following as the voltage increase rate limit dVu, measured in units of V/s).

Similarly, the battery status acquisition section 401 derives a limit value of the rate of decrease of the charge/discharge power level of the battery 108 (referred to in the following as the charge/discharge power decrease rate limit dWl, measured in units of W/s). This is a value whereby the rate of decrease of the power supply voltage appearing on the power supply bus 115 is held to within a specific maximum value (referred to in the following as the voltage decrease rate limit dVl (measured in units of V/s). The range of values of charge/discharge power between dWu and dWl is referred to in the following as the No. 2 range.

The values of dVu and dVl are predetermined as defining a range of rate of variation of the power supply voltage whereby no annoyance will be caused to the vehicle driver due to effects of a resultant variation in power supplied to the electrical loads (e.g., flickering of the vehicle headlamps, etc.).

In practice, it is undesirable to limit the rate of variation of the generated electrical power when the there is a change in the generator distributed power value that is caused by a change in the load power demand (e.g., due to the vehicle driver switching on the headlamps, etc.). Hence with this embodiment as described hereinafter, the power demand calculation section 403 judges (based on the load power demand value) whether a change in the charge/discharge power is caused by a change in the load power demand. If that is the case, then the generator distributed power value is set as the generated power demand value, irrespective of whether or not the charge/discharge power is changing.

Figure 5:
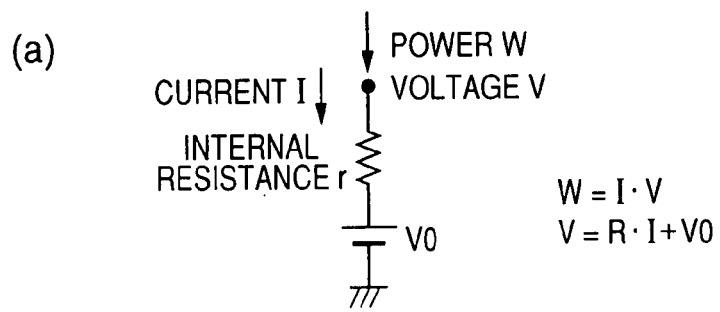
FIG. 5 is a diagram for describing a method of calculating a charge/discharge power increase rate limit dWu.

FIG. 5 shows diagrams for describing a method of calculating the charge/discharge power increase rate limit dWu in step S202. In this example, dWu is calculated by using an equivalent circuit for the vehicle battery as shown in diagram (a) in FIG. 5. Designating the detected values of current and voltage of the battery 108 as I and V respectively, and the internal resistance of the battery as r (where r is calculated by the battery status acquisition section 401 based on the relationship between the current and voltage of the battery 108), the charge/discharge power increase rate limit dWu is obtained from the equation shown in diagram (b) in FIG. 5.

The charge/discharge power decrease rate limit dWl is derived in a similar manner to that for the charge/discharge power increase rate limit dWu.

The reason for using respective limit values (dWu, dWl) for the rate of increase and rate of decrease of the battery charge/discharge power level is that the value of the internal resistance r of the battery will differ in accordance with whether the voltage of the battery 108 (i.e., the power supply voltage appearing on the power supply bus 115) is increasing or is decreasing.

The relationship between variation of the charge/discharge power level and resultant variation of the battery voltage may not be accurately represented by the equation shown in (b) in FIG. 5, so that an error may arise in the result. However with this embodiment, compensation is applied to the level of generated power to correct for the effects of such an error, as described hereinafter.

Next, (step S103) if the optimum charge/discharge power is changing, the power demand calculation section 403 applies compensation to the generator distributed power value to make the rate of change of the charge/discharge power come within the above-described No. 2 range (range of permissible rates of variation of the power supply voltage), to obtain the generated power demand value. If the optimum charge/discharge power is unchanged, then the generator distributed power value produced from the distributed power calculation section is set as the generated power demand value, as described above.

The torque demand calculation section 406 then calculates the value of drive torque that must be supplied by the engine to the generator 102, for the demand value of generated power to be produced, and transmits data expressing that demand value of torque to the ECU 103.

Next, (step S104) the available power value calculation section 407 receives data from the engine control section 408 specifying the available torque for driving the generator 102 (where "available torque" has the specific significance defined hereinabove), and thereby calculates the value of available generated power value that can be produced by the generator 102 at the current point in time (where "available generated power" has the specific significance defined hereinabove). That value is determined based on the available torque and the speed of rotation of the generator 102. Methods of obtaining such a generator speed of rotation are well known, so that detailed description is omitted.

When the system is operating in a condition in which there is no variation in the demand for power to be produced from the generator 102 (i.e., while the charge/discharge power level is constant and there is no change in the electrical load power demand), the available generated power is substantially identical to a generated power command value that is derived by the power supply control apparatus 105 (as described hereinafter) to control the generator 102. If there is a sudden change in the generated power demand value, a corresponding increased level of demand torque is requested (i.e., conveyed by the aforementioned data transmitted from the torque demand calculation section 406). The ECU 103 thereby initiates control of the engine 101 to accordingly increase or decrease the amount of torque that is being applied by the engine 101 to drive the generator 102. However there will be a delay before the engine 101 actually completes the required change in drive torque (i.e. until the available torque matches the torque demand), due to the control response delay of the engine 101.

Hence, the available torque for driving the generator 102 (i.e., an amount that is additional to the torque currently applied for driving the vehicle) is calculated by the engine control section 408 of the ECU 103 by taking into account the control response delay.

Thus, the available generated power value is calculated by the available power value calculation section 407 based on information including the available torque value, supplied by the engine control section 408.

It can thus be understood that during a short interval after a change is made in the demand value of torque, the available torque value will differ from the demand value, due to the delay in response of the engine 101. Hence, during such an interval, the available generated power value will differ from the generated power demand value.

Figure 6:
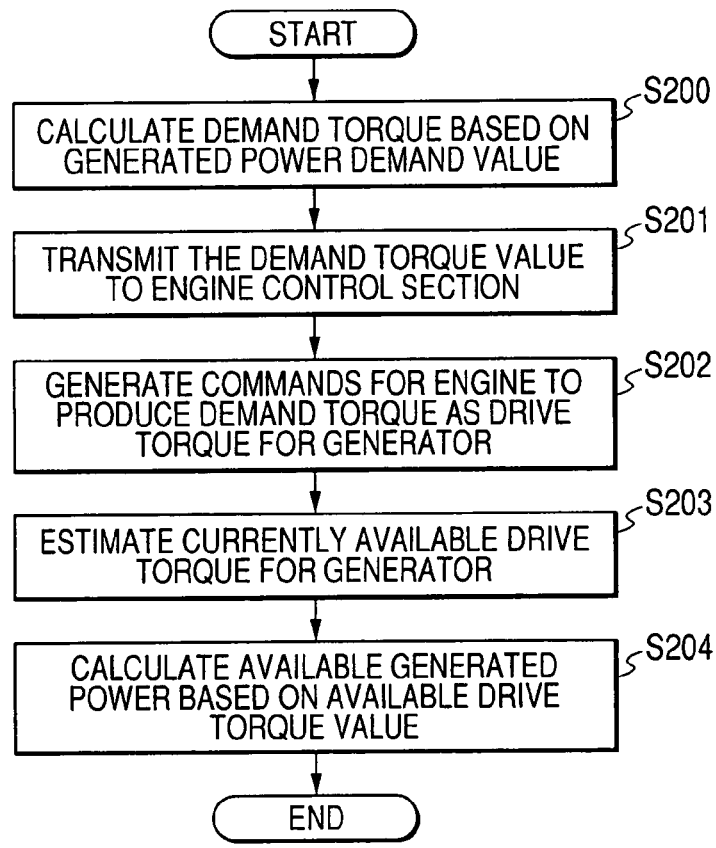
FIG. 6 is a flow diagram of an operation sequence executed by the system of the first embodiment, for deriving an available value of generated electrical power.

FIG. 6 is a flow diagram showing an operation sequence constituting step S104 in FIG. 3, which is executed by the power supply control apparatus 105 in conjunction with the ECU 103, for deriving the available generated power value. Firstly, based on the current speed of rotation of the generator 102 and the voltage appearing on the power supply bus 115, the torque demand value calculation section 406 utilizes a power generator model corresponding to the generator 102 to calculate the level of demand torque of the generator 102 based on the generated power demand value (step S200).

The torque demand value calculation section 406 then transmits this value of demand torque to the engine control section 408 of the ECU 103, as the amount of torque that will be absorbed in driving the generator 102 (step S201). The engine control section 408 then (step S202) generates control commands for the engine 101, to set appropriate control values of throttle opening degree, fuel injection amount, ignition timing, etc., for the engine. These control values are determined such as to initiate an operating condition of the engine 101 in which the demand value of torque for driving the generator 102 will be produced in addition to the torque that is being applied to drive the vehicle, with the current speed of the engine being maintained.

As described above, when a change in engine torque is required, the actual torque will reach the specified value only after a delay interval.

Next (step S203), the engine control section 408 calculates the available torque for driving the generator 102. This is calculated by taking into account the control response delay of the engine. Data expressing the available torque value are then transmitted to the available power value calculation section 407, which then calculates the available generated power of the generator 102, based on the available torque value (step S204).

In that way, the available generated power value is derived in step S104 of FIG. 3. That value is then supplied by the available power value calculation section 407 to the power generation mediation section 404.

Following step S104, in step S105, the battery status acquisition section 401 derives the amount of momentary increase in the charge/discharge power level which (if it were to occur at the present point in time) would cause the power supply voltage to increase by an amount referred to in the following as the voltage increment limit value ΔVu. That amount of increase in the charge/discharge power level is referred to in the following as the charge/discharge power deviation upper limit ΔWu.

Similarly, the battery status acquisition section 401 derives the amount of momentary decrease in the charge/discharge power level that would cause the power supply voltage to momentarily by an amount referred to in the following as the voltage decrement limit value ΔVl. That amount of decrease in the charge/discharge power level is referred to in the following as the charge/discharge power deviation lower limit ΔWl.

The voltage increment limit value ΔVu and the voltage decrement limit value ΔVl are predetermined as the maximum amounts of momentary increase or decrease in the power supply voltage that can occur without resulting in sensations of discomfort to the vehicle driver, e.g., due to flickering of the headlamps, etc. Such momentary increases or decreases of the supply voltage can arise due to a delay in decreasing or increasing the generated power to a currently required value, due to the aforementioned engine response delay.

The range of values between the charge/discharge power deviation upper limit value ΔWu and the charge/discharge power deviation lower limit value ΔWl will be referred to as the No. 3 range. As can be understood from the above, if amounts of battery charge/discharge power variation are held within that range, resultant momentary variations in the power supply voltage will not exceed the allowable range of voltage variation, between ΔVl and ΔVu.

Figure 7:
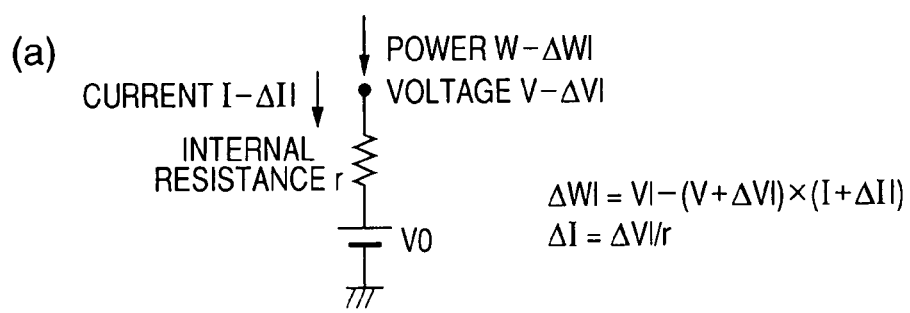
FIG. 7 is a diagram for describing a method of calculating a charge/discharge power deviation lower limit value ΔWl.

FIG. 7 shows diagrams for describing a method of calculating the charge/discharge power deviation lower limit value ΔWl. This is calculated by using the battery equivalent circuit shown in diagram (a) of FIG. 7. In the same way as for FIG. 5 described above, the detected values of current and voltage of the battery 108 are designated as I and V respectively, and the internal resistance of the battery is designated as r (calculated based on the relationship between the current and voltage of the battery 108). The charge/discharge power deviation lower limit value ΔWl is obtained from the equation shown in diagram (b) of FIG. 7.

The charge/discharge power deviation upper limit value ΔWu is obtained in a similar manner to that for the charge/discharge power deviation lower limit value ΔWl, i.e., with ΔVh being utilized in the calculations, in place of ΔVl.

In the same way as described hereinabove for the case of the respective limit values (dWu, dWl) for the rate of increase and rate of decrease of the battery charge/discharge power level, the reason for using respective upper and lower limit values (ΔWu, ΔWl) for the deviation of the charge/discharge power level is that the value of the internal resistance r of the battery will differ in accordance with whether the voltage of the battery 108 is increasing or is decreasing. The calculated values of ΔVh and ΔVl are supplied to the power generation mediation section 404.

Next, (step S106 in FIG. 3) the power generation mediation section 404 calculates a generated power command value, specifying the level of power to be produced by the generator 102. This calculation is performed based upon, in combination, the generated power demand value which was calculated in step S103, the available generated power value that was obtained in step S104, and the charge/discharge power deviation limits ΔWu and ΔWl.

Figure 8:
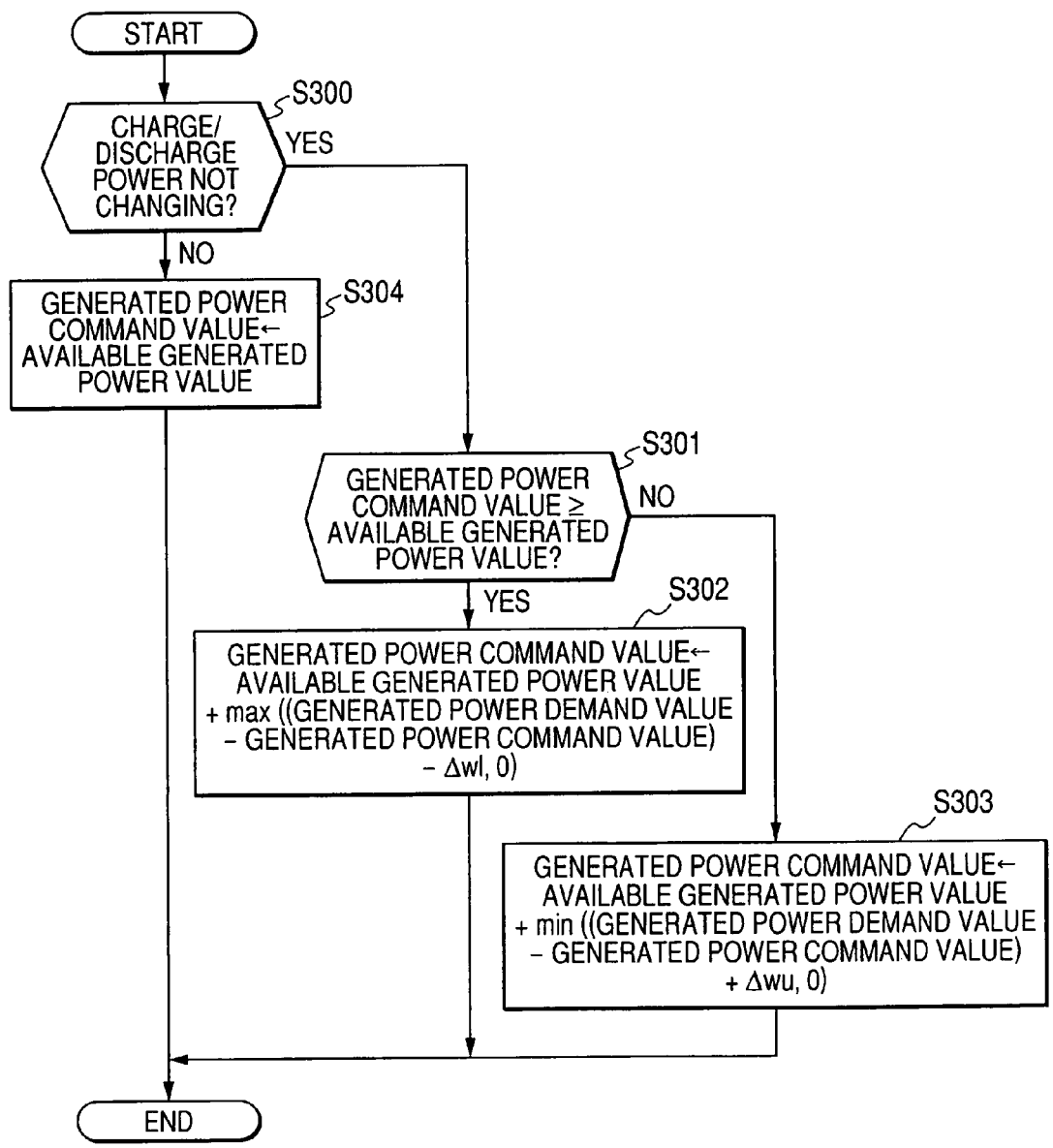
FIG. 8 is a flow diagram of an operation sequence for calculating a generated power command value, executed with the first embodiment.

FIG. 8 is a flow diagram showing a specific example of an operating sequence for performing this calculation. Firstly, the power generation mediation section 404 judges whether the charge/discharge power is currently being changed (i.e., by the action of the battery status monitoring section 401, in effecting a change in the generator distributed power value) (step S300). If it is judged that the charge/discharge power is not currently being changed (i.e., so that any change in the generated power demand value must be caused by a change in the load power demand), then in the power generation mediation section 404 a decision is made as to whether the generated power demand value is greater than the available generated power value (step S301). This condition will occur temporarily when there is a sudden increase in the load power demand.

If the generated power demand value is greater than the available generated power value (a YES decision in step S301), so that there is a generated power deficit, then commands are generated by the power supply control apparatus 105 and ECU 103 for controlling the engine 101 to produce increased torque and thereby increase the generated electrical power. However there will be a short interval in which the power deficit continues, due to the aforementioned engine control response delay.

In that condition, if the generated power command value were to be immediately increased to the extent of the power deficit, then the power supply voltage could be held unchanged. However (due to the sudden increase in the torque load imposed by the generator 102) the rotation speed of the generator 102 would fall. If on the other hand the generated power command value were to be left unchanged then the engine rotation speed would remain constant, however there would be a drop in the power supply voltage, since discharge power would flow from the battery 108.

For that reason with this embodiment, it is ensured that for example when there is a momentary deficit in the generated power due to a sudden increase in the load power demand, the generated power command value is increased only the extent that the deficit of generated power becomes no greater than the charge/discharge power deviation lower limit value ΔWl. In that way it is ensured that the resultant momentary drop in the power supply voltage will not exceed the limit value ΔVl, while reducing the amount of drop in engine speed of rotation as far as possible.

That is to say, during such an interval of generated power deficit or excess the generated power command value is set by adding to the available value of power a "mediation" amount, which is a compromise between the conflicting requirements for preventing variations in the engine speed and for preventing variations in the power supply voltage.

Specifically, step S302 is executed if it is judged in step S301 that there is a generated power deficit. In step S302, the power generation mediation section 404 sets an updated generated power command value as the sum of the available generator power and the power deficit (i.e., difference between the available generated power and the power demand), or as the sum of the available generator power and the power deficit minus the charge/discharge power deviation lower limit value ΔWl, whichever is the smaller. It is thereby ensured that the amount of momentary lowering of the power supply voltage will be less than the voltage decrement limit value ΔVl. Step S302 can be expressed as:

generated power command value←available generated power value+max ((generated power demand value−generated power command value)−charge/discharge power deviation lower limit value ΔWl, 0)     (1)

In the above, max (x, y) signifies the larger one of the values x and y.

If the generated power demand value is less than the available generated power value (a NO decision in step S301) then this signifies an excess of generated power, which will result in a momentary increase in the power supply voltage.

However, by ensuring that the excess amount of generated power is held to a value that is no greater than the charge/discharge power deviation upper limit value ΔWu, the power generation mediation section 404 ensures that the resultant momentary increase in the power supply voltage will not exceed the voltage increment limit value ΔVu.

To achieve this, then (corresponding to step S303 in FIG. 8) the power generation mediation section 404 derives an updated generated power command value as:

generated power command value←available generated power value+min ((generated power demand value−generated power command value)+charge/discharge power deviation upper limit value ΔWu, 0)     (2)

If no change is occurring in the charge/discharge power level, (a NO decision in step S300) then the generated power command value is left unchanged (step S304).

In that way, by setting the command value of power based upon the above-described allowable amounts of increase or decrease in the charge/discharge power level, the generated power demand value, and the available generated power value, the power generation mediation section 404 derives a command value of power such as to ensure that when a sudden change occurs in the load power demand, that change will not cause an excessive momentary variation in the power supply voltage or an excessive momentary variation in the engine speed.

This is ensured irrespective of the engine response delay, due to the fact that the available generated power value is derived (by the engine control section 408) taking into account the effects of that response delay.

Returning to FIG. 3, after executing step S106 as described above, step S107 is executed in which the power compensation section 405 performs feedback compensation of the generated power command value that has been calculated in step S106. This compensation is performed based on the actual value of power supply voltage, as described hereinafter. A compensated generated power command value is thereby obtained which is unaffected by any errors in the calculated values of dWu or dWl.

The generator control section 104 then controls the generator 102 to generate the compensated generated power command value (step S108).

Figure 9:
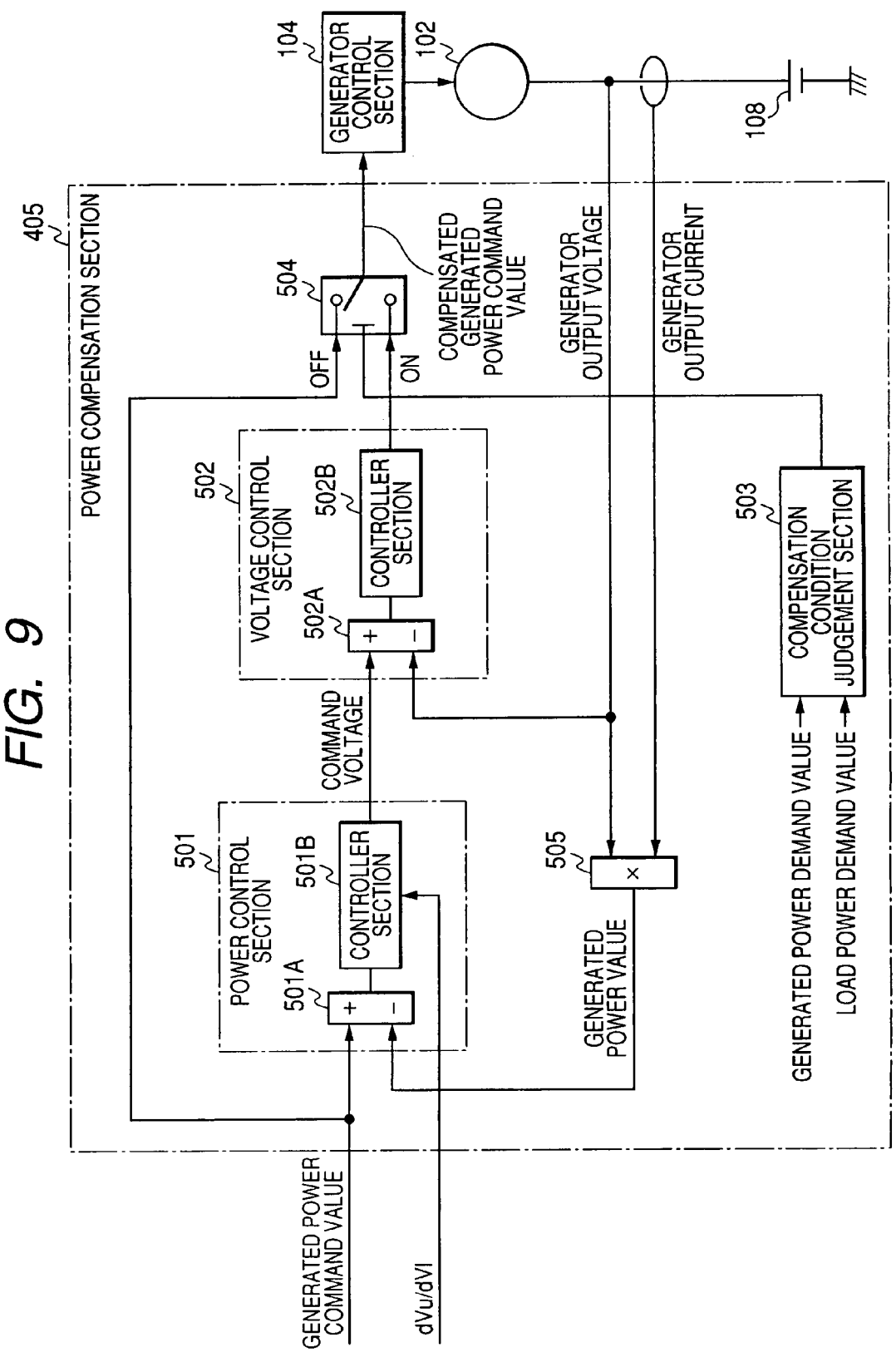
FIG. 9 shows details of the configuration of a power supply compensation section in the first embodiment.

FIG. 9 is a diagram showing details of the power compensation section 405 of the power supply control apparatus 105, i.e., illustrating the operations executed in step S108 of FIG. 3. As shown, the power compensation section 450 includes a power control section 501, a voltage control section 502, a generated voltage compensation execution judgement section 503, a switch 504, and a multiplier section 505. The generated voltage compensation execution judgement section 503 judges whether there is a change in the charge/discharge power, based on whether there is a change in the generated power demand that is caused by a change in the load power demand. If there is no change in the charge/discharge power level, the switch 504 is switched to the OFF condition, while otherwise, it is set to the ON condition. In the OFF condition, the generated power command value is outputted unchanged from the power compensation section 405.

Hence, the power compensation section 450 performs compensation of the generated power command value only when there is change in the demand for generated power due to a change that is made in the charge/discharge power, rather than a change in the load power demand. In this condition, the combination of the power control section 501 and voltage control section 502 applies feedback control of the generator 102 to ensure the rate of change of the power supply voltage is held within the predetermined permissible range of variation described above.

The multiplier section 505 multiplies detected values of the power supply voltage and the output current of the generator 102 to obtain a detected value of power that is currently being generated by the generator 102, and supplies that value to the power control section 501. In the power control section 501, a subtracter 501A compares the generated power command value with the detected value of generated power to obtain a power difference value, which is supplied to the control section 501B.

The power difference represents an amount by which the actual generated power must be compensated to bring the difference output from the subtracter 501A to zero, i.e., an amount of charge/discharge power adjustment. The voltage amount corresponding to that power adjustment amount is therefore calculated (using the relationship of FIG. 5 described above), and applied to compensate the power supply voltage, to thereby obtain a command value of power supply voltage.

The obtained value of command voltage is then adjusted by the controller 501B, to ensure that the rate of variation of the command voltage will be within the permissible variation rate range that is defined by the limit values dVu and dVl.

In the voltage control section 502, the command voltage value and the power supply voltage are compared using the subtracter 502A, to obtain a voltage difference. The controller 502B converts that voltage difference to a corresponding amount of change in the charge/discharge power, and compensates the command value of generated power by that amount of power, to obtain the compensated command value of generated power, i.e., as a value whereby the output from the subtracter 502A will be brought to zero.

The compensated command value of generated power is transferred via the switch 504 to the generator control section 104.

In that way, when there is a change in the level of charge/discharge power while the load power demand is unchanged, the rate of variation of the power supply voltage is accurately held within the permissible range of variation rates.

Figure 10:
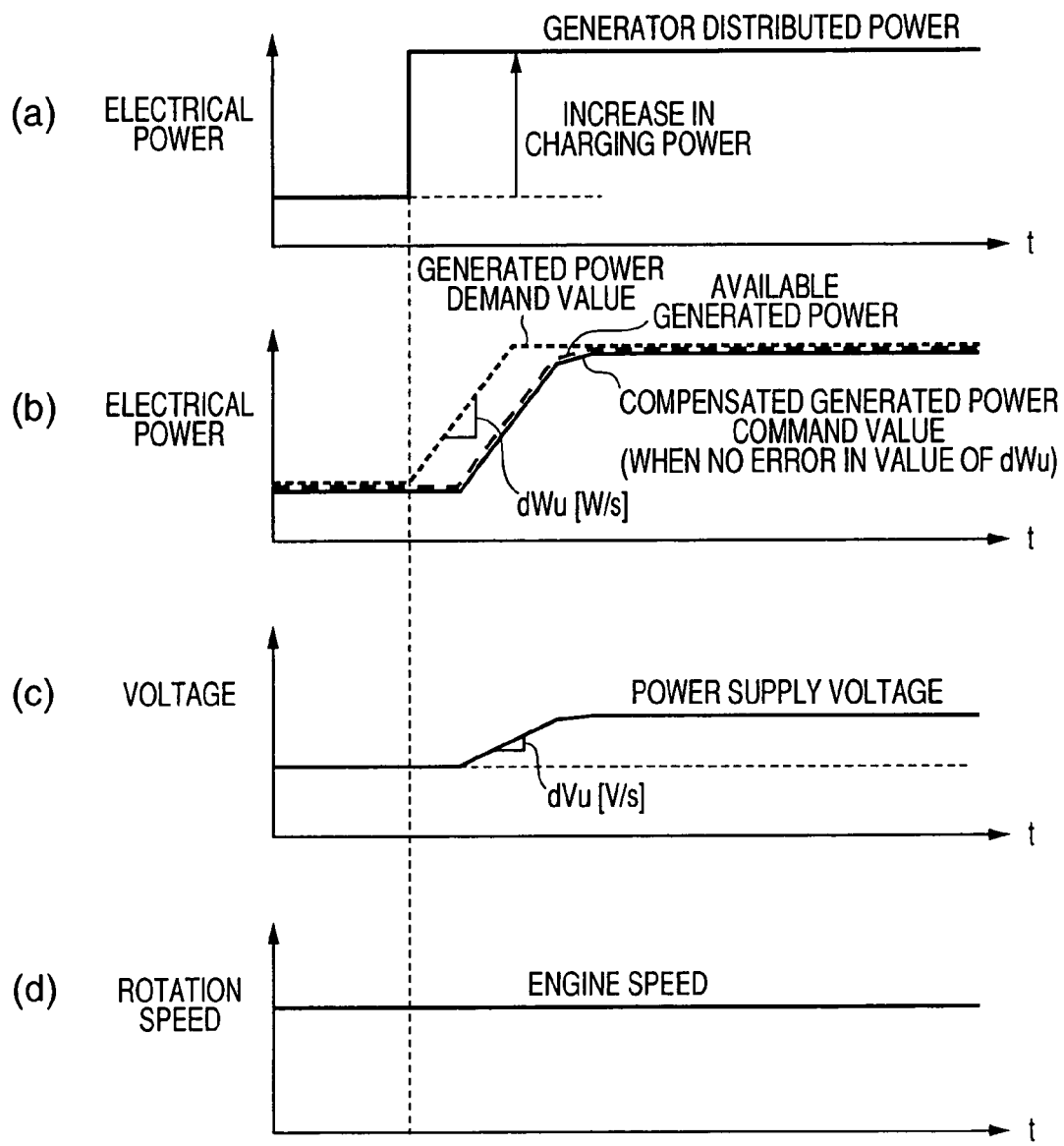
FIG. 10 shows timing diagrams for describing an example of operation when there is a sudden increase in the level of charging power supplied to the battery, assuming an ideally correct value of a charge/discharge power increase rate limit value.

FIG. 10 shows diagrams for describing the operation when there is a sudden change in the charge/discharge power level while the load power demand remains unchanged, taking as an example the case in which the level of power supplied to charge the battery 108 is increased. It is assumed here that the calculated values of the charge/discharge power increase rate limit dWu and charge/discharge power decrease rate limit dWl are ideally accurate.

In this case, when the increase in the charge/discharge power level occurs, so that the required value of generator distributed power increases accordingly as shown in diagram (a) of FIG. 10, the power demand calculation section 403 adjusts the generator distributed power value in accordance with the limit values dWu, dWl, so that the rate of increase of the charging power will be within the range defined by these limit values. A corresponding command value of generated power is derived from the generated power mediation section 404, which is matched to the response of the engine 101 as illustrated in diagram (b) of FIG. 10 (i.e., is controlled in accordance with the available torque, as described above). The power compensation section 405 operates on this value, to derive a compensated command value of generated power.

As shown in diagram (b), if there is no error in the power variation rate limit value dWu, then the compensated command value of generated power will match the command value of generated power, during the increase in the charge/discharge power.

Specifically, since the available amount of torque that can be provided by the engine 101 (without lowering of engine speed) for driving the generator 102 is held matched to the amount of torque that is currently being absorbed by the generator 102, there is no reduction in the engine speed, as illustrated in diagram (d) of FIG. 10, in spite of the delay of the engine 101 in responding to commands for increasing the amount of torque applied to drive the generator 102.

In addition, the rate of change of the supply voltage is held to a value that is less than the voltage increase rate limit dVu, as shown in diagram (c) of FIG. 10C.

Figure 11:
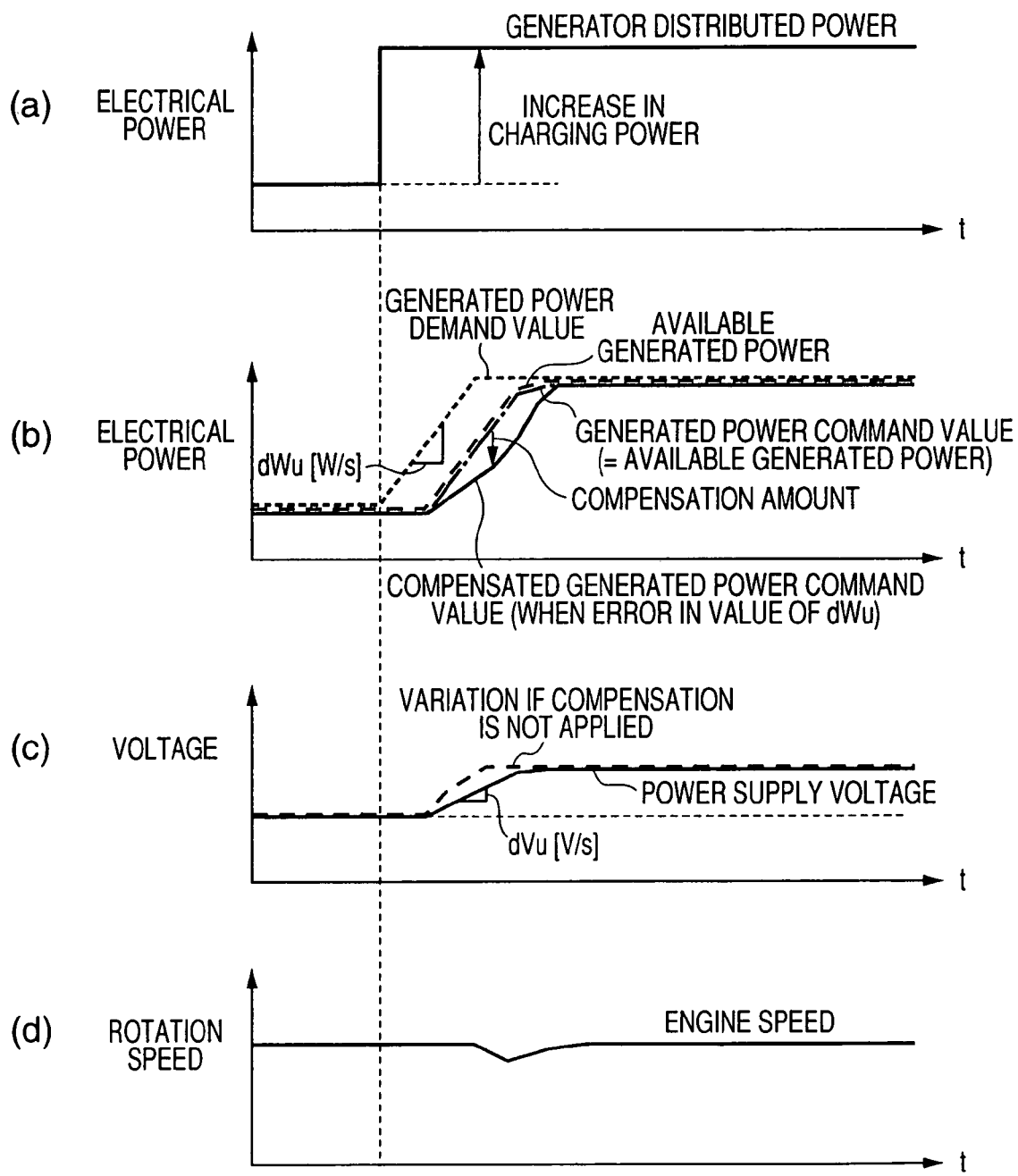
FIG. 11 shows timing diagrams corresponding to FIG. 10, for describing an example of operation when there is an error in a charge/discharge power increase rate limit value.

Diagrams (a) to (d) in FIG. 11 illustrate an example of the operations performed in step S106 of FIG. 3 in the case in which (with the load power demand unchanged) there is a sudden increase in the power supplied to charge the battery 108, and there is an error in the charge/discharge power increase rate limit dWu. Diagrams (a) to (d) in FIG. 11 respectively correspond to diagrams (a) to (d) in FIG. 10 above.

For example as shown in diagram (b) of FIG. 11, if the charge/discharge power increase rate limit dWu is excessively high, so that there is an excessively rapid rate of increase in the generated power, the power supply voltage will increase excessively rapidly, and may overshoot the required value, as illustrated by the broken-line portion in diagram (c) of FIG. 11.

However with this embodiment in such a case, feedback compensation is applied by the power compensation section 405 as described above, to hold the rate of change of the power supply voltage within the voltage increase rate limit dVu, as illustrated by the full-line portion in diagram (c).

This compensation operation does not result in a significant variation of the engine speed, as illustrated in diagram (d) of FIG. 11.

Figure 12:
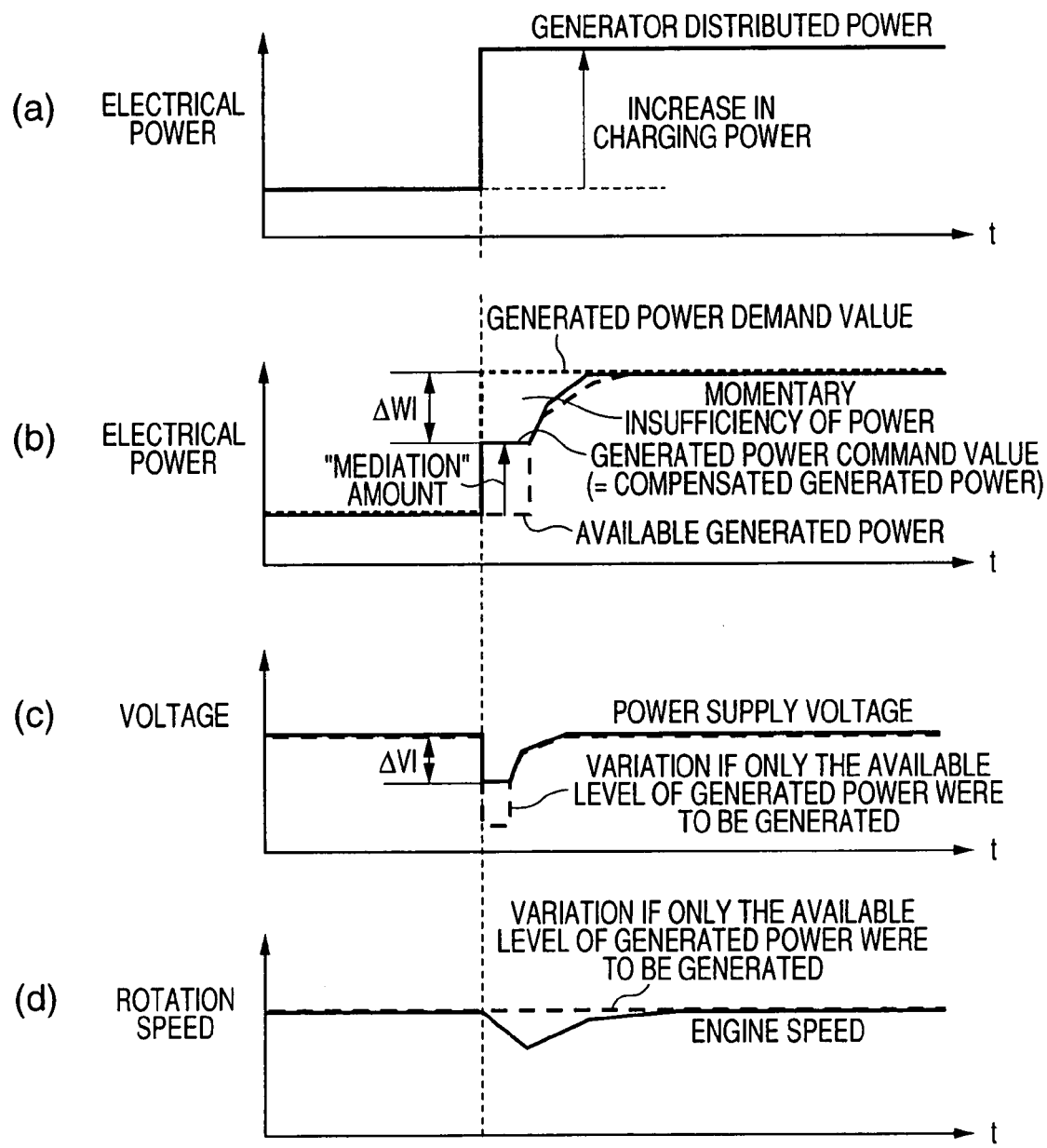
FIG. 12 shows timing diagrams for describing an example of operation when there is a sudden increase in electrical load demand, with the first embodiment.

Diagrams (a) to (d) of FIG. 12 illustrate the control operations described above referring to the flow diagram of FIG. 8, i.e., the contents of step S106 of FIG. 3, for the case in which the generated power demand value changes due to a sudden increase in the load power demand, with the charge/discharge power remaining unchanged. When the load power demand suddenly increases as shown in diagram (a) in FIG. 12, then even if the generated power command value is immediately increased in accordance with the required increase in demand, there will be a momentary insufficiency of generated electrical power due to the aforementioned response delay of the engine 101. As a result there will be a deviation of the charge/discharge power, i.e., power will be discharged from the battery 108, so that the power supply voltage will fall.

The amplitude of that voltage drop, if not compensated by the operation of the generated power mediation section 404, is indicated by the broken-line portion in diagram (c) of FIG. 12.

However with this embodiment, the power generation mediation section 404 performs a function whereby the conflicting requirements for minimizing the amount of decrease in the power supply voltage and of minimizing the amount of lowering of the engine speed of rotation are reconciled as far as possible. This is achieved as illustrated in diagram (b) of FIG. 12, in the case of an increase in load power demand, by reducing the command value of generated power below the generated power demand value.

The momentary increase in the amount of torque absorbed by the generator 102 (due to the increase in generated power) is thereby reduced, by comparison with the case in which such mediation is not performed. Hence, only a small amount of momentary lowering of the engine speed occurs, as illustrated in diagram (d) of FIG. 12. Since the command value of generated power is reduced from the demand value of generated power when the increase in load occurs, the power supply voltage will momentarily fall. However as illustrated in diagram (c) of FIG. 12, by limiting the maximum amount of the generated power insufficiency (i.e., amount of deviation of the charge/discharge power) to be no greater than $\Delta Wl$, it is ensured that the maximum amount of momentary reduction in the power supply voltage is limited to the amount $\Delta Vl$. This operation corresponds to the above-described step S302 of FIG. 8.

Thus with this embodiment, when there is a change in the level of electrical load and a consequent change in the generated power demand value, a demand value of torque is calculated that corresponds to the generated power demand value. Data expressing that torque demand value (i.e., the torque that is to be applied to drive the generator 102) are transmitted to the engine control apparatus 103, which responds by controlling the engine 101 (e.g., by adjusting fuel injector amounts, ignition timings, etc.) to initiate an operating condition whereby that demand value of torque will be produced in addition to the torque required to drive the vehicle.

Since the engine cannot respond immediately, the ECU 103 at that time calculates the available value of torque that can currently be provided at that point in time, for driving the generator 102 (while leaving the engine speed unchanged). Data expressing that available value of torque are then transmitted to the power supply control apparatus 105.

The power supply control apparatus 105 responds by calculating an available value of generated electrical power, corresponding to the available value of torque, then calculating the difference between the available value of generated electrical power and the generated power demand value.

The command value of generated power is then adjusted to make the command value of generated power match the demand value of generated power, or, when that is momentarily not possible (due to the engine response delay) to reduce the difference between the demand value and the command value of generated power to an amount no greater than the lower limit value $\Delta Wl$ (in the case of an increase in the load power demand) or no greater than the upper limit value $\Delta Wu$ (in the case of a decrease in the load power demand).

It will be understood that the operation of the embodiment described above is achieved through repetitive executions of the sequence shown in FIG. 3, with each execution utilizing or modifying values that have been derived in preceding executions of the sequence.

Second Embodiment

Figure 13:
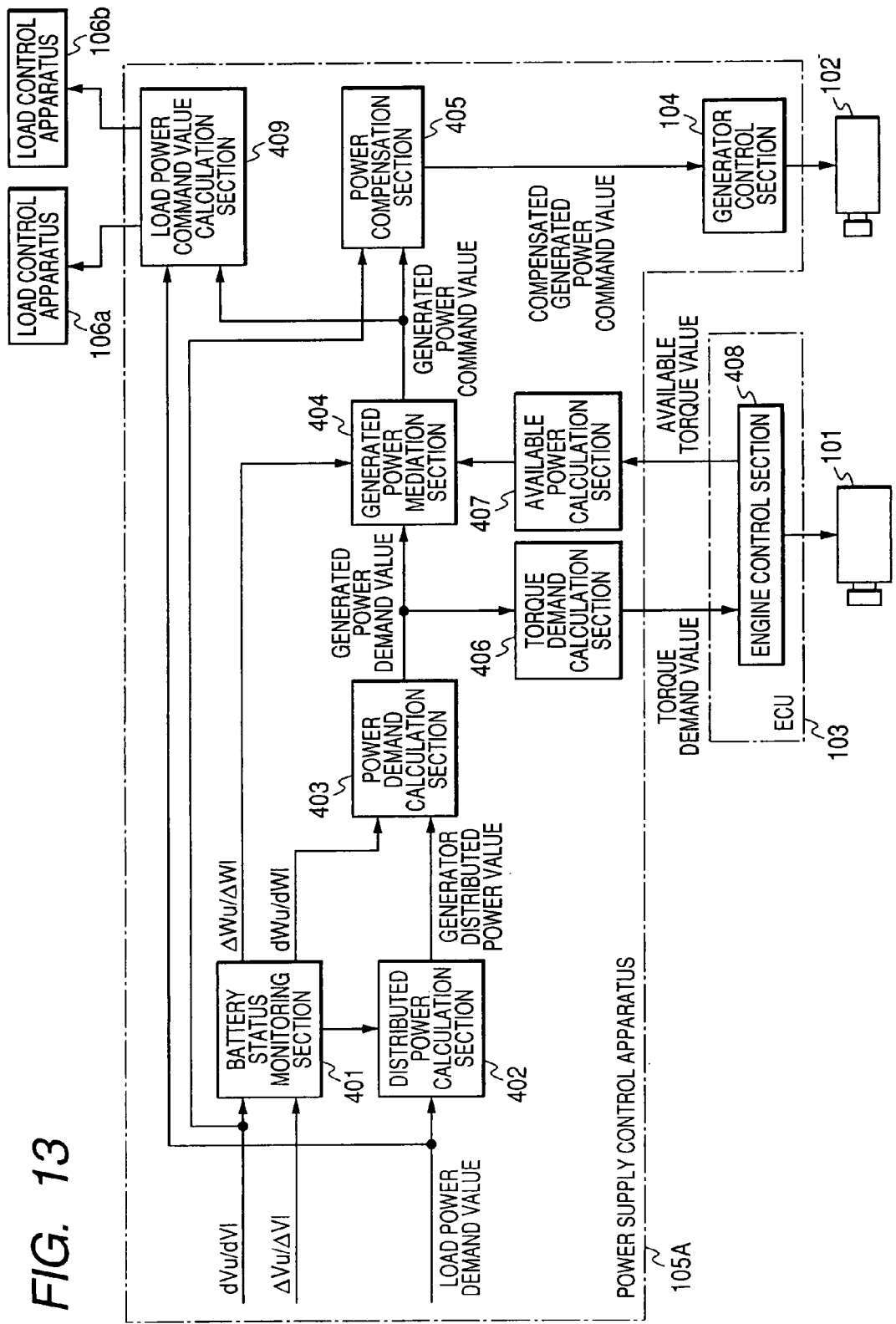
FIG. 13 shows details of the configuration of a power supply control apparatus in a second embodiment of a vehicle-use power supply system.

FIG. 13 shows details of a power supply control apparatus 105A in a second embodiment of a vehicle-use power supply system. The second embodiment differs from the first embodiment only in that the power supply control apparatus 105 shown in FIG. 1 is replaced by the power supply control apparatus 105A, which differs from the power supply control apparatus 105 shown in FIG. 2 by further including a load power command value calculation section 409. The load power command value calculation section 409 receives the load power demand value (which is also inputted to the distributed power calculation section 402, as described for the first embodiment) and the generated power command value that is derived by the power generation mediation section 404 as described for the first embodiment. Based on these inputs, the load power command value calculation section 409 derives a command value of load power to be supplied by the load control apparatuses 106a, 106b to their loads 107a, 107b. In other respects, the configuration and operation of the power supply control apparatus 105A of this embodiment are identical to those of the power supply control apparatus 105 of the first embodiment.

Figure 14:
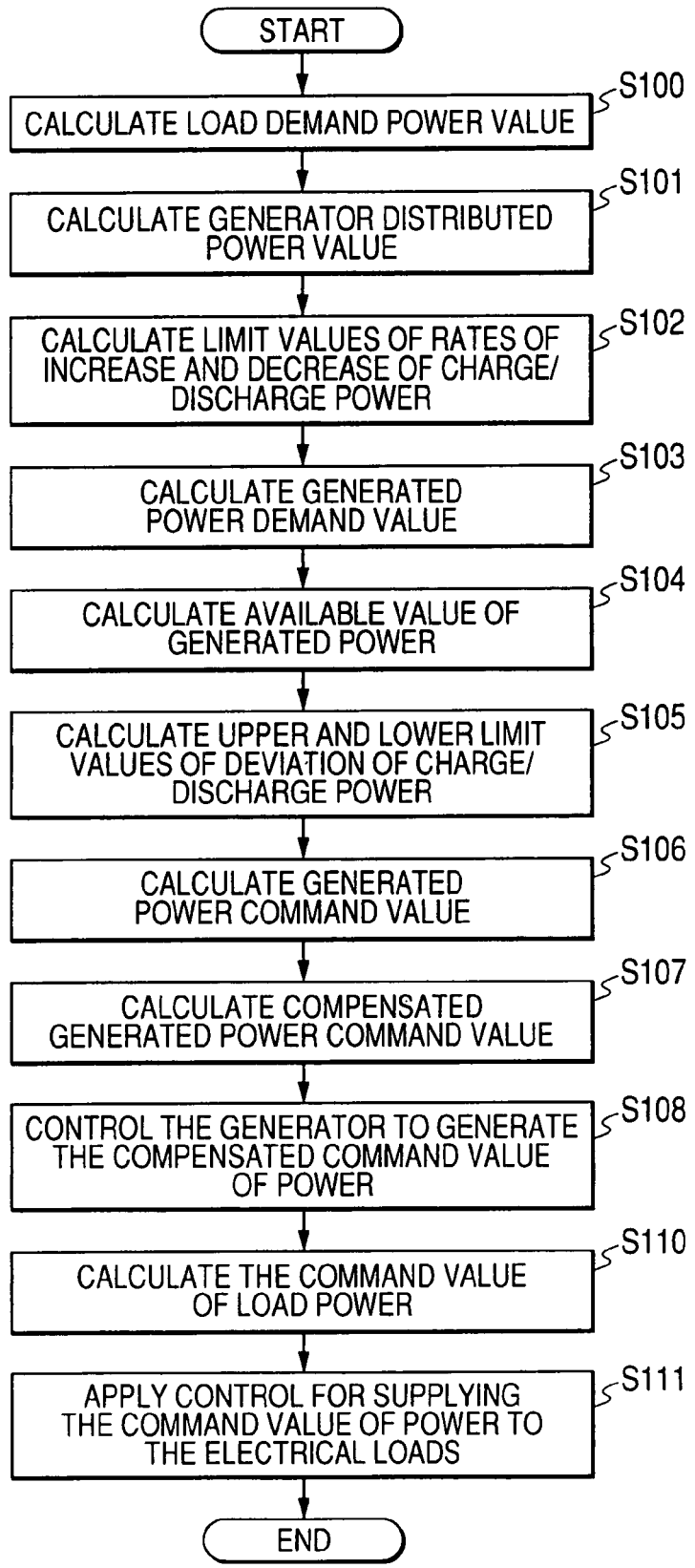
FIG. 14 is a flow diagram of an operation sequence executed by the second embodiment.

FIG. 14 is a flow diagram showing an operating sequence that is repetitively executed by this embodiment, with the diagram showing mainly the generation control operations performed by the power supply control apparatus 105A. The operating sequence of FIG. 14 differs from that of FIG. 3 for the first embodiment in that the steps S110 and S111 are added.

Figure 15:
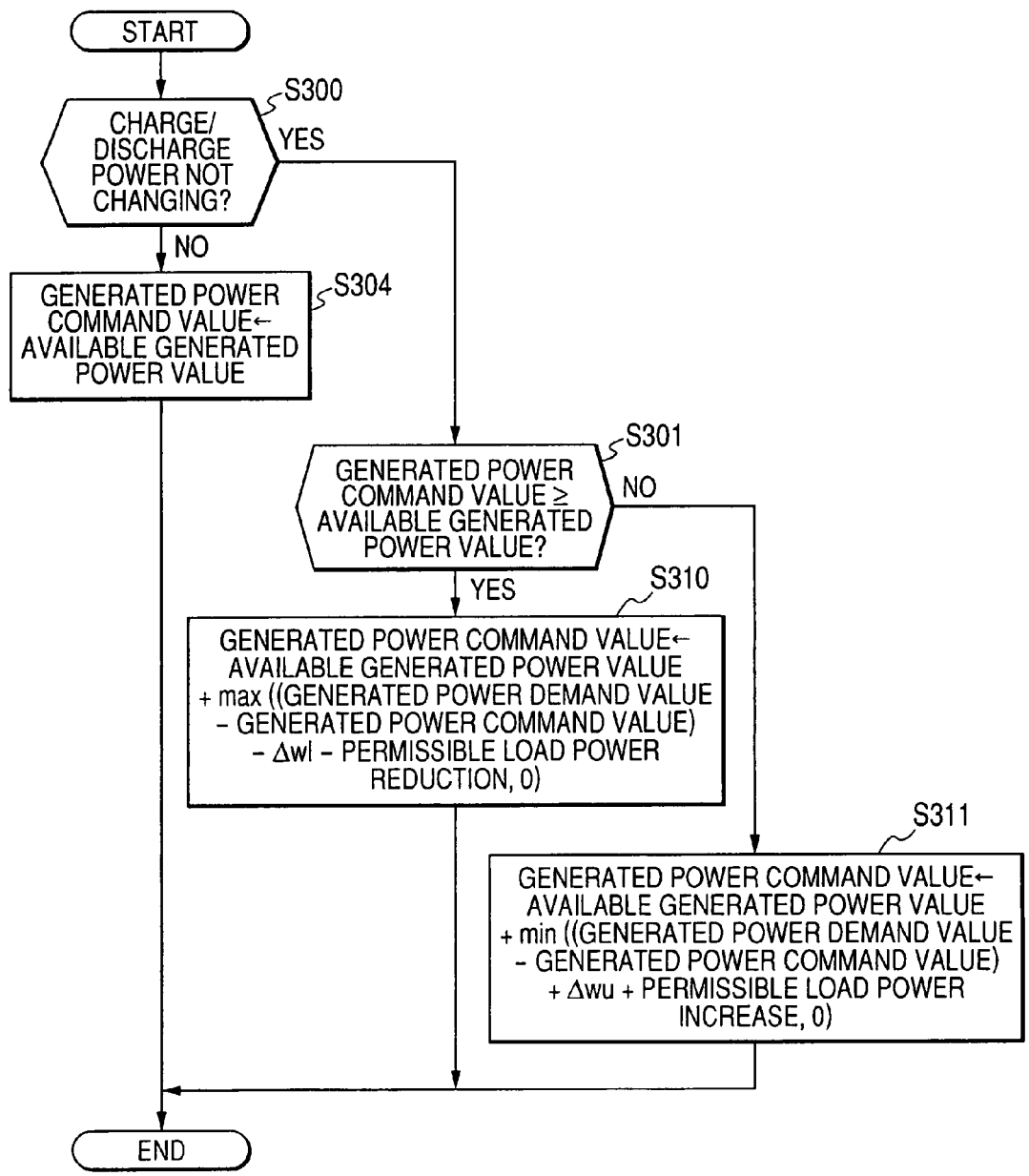
FIG. 15 is a flow diagram of an operation sequence for calculating a generated power command value with the second embodiment.

FIG. 15 is a flow diagram showing a specific example of calculating the generated power command value with the second embodiment, i.e., showing the contents of step S106 in FIG. 14. FIG. 15 differs from FIG. 8 of the first embodiment in that the steps S302 and S303 are replaced by the steps S310, S311.

In FIG. 15, firstly if it is judged in step S301 that the generated power demand value is greater than or equal to the available generated power value, i.e., a YES decision, then the power generation mediation section 404 utilizes a predetermined value of permissible load power reduction to derive an updated generated power command value by using the following relationship (3) (step S310). The permissible load power reduction is a maximum amount by which the total load power can be temporarily reduced without causing discomfort to the vehicle driver (e.g., with the reduction being made in power supplied to electrical loads such as the engine cooling fan, defogger, etc.).

generated power command value←available generated power value+max (((generated power demand value−generated power command value)−charge/discharge power deviation lower limit value $\Delta Wl$−permissible load power reduction), 0)   (3)

However if it is judged in step S301 that the generated power demand value is less than the available generated power value, i.e., there is an excess of available generated power (NO decision), then the power generation mediation section 404 utilizes a predetermined permissible load power increase amount to derive an updated generated power command value by using the following relationship (4) (step S311). The permissible load power increase is a maximum amount of temporary increase in load power that can be made without causing discomfort to the vehicle driver.

generated power command value←available generated power value+min (((generated power demand value−generated power command value)+charge/discharge power deviation upper limit value $\Delta Wu$+permissible load power increase), 0)   (4)

On completion of step S106 as described above, deriving the compensated generated power command value in step S107, and controlling the generator 102 accordingly (step S108), step S110 is executed in which the load power command value calculation section 409 utilizes the load power demand value and the generated power command value (derived in step S106) to calculate a total amount of power that is to be actually supplied to the electrical loads. That amount is referred to in the following as the load power command value.

If there has been a sudden increase in the load power demand, the load power command value is reduced (in relation to the load power demand) by an amount which will ensure that:

(1) the amount of generated power insufficiency that will be supplied by discharging the battery 108 does not exceed the charge/discharge power deviation lower limit value ΔWl, while
(2) the amount of reduction in the (total) power supplied to the loads will not exceed the permissible load power reduction value.

This is achieved by setting an adjusted load power demand value, which is higher than available generated power and is less than the original load power demand value by an amount that does not exceed the sum of the permissible load power reduction and the charge/discharge power deviation lower limit value ΔWl. The adjusted load power demand value is then set as the load power command value.

In that way it is ensured that the momentary insufficiency of power cannot exceed the charge/discharge power deviation lower limit value ΔWl (as for the first embodiment) while also ensuring that the power supplied to the loads will not be reduced excessively.

The calculation of the load power command value in the case of an increase in the electrical load can be expressed by the following equation:

load power command value=load power demand−min (permissible load power reduction, (generated power demand value−generated power command value−charge/discharge power deviation lower limit value Δ*Wl*)) (5)

Similarly, if the generated power demand value is found to be less than the available generated power value, i.e., there is an excess of generated power due to a decrease in the power consumed by the electrical loads, the updated load power command value is calculated using the following equation:

command value of load power=load power demand value+min(permissible load power increase, (generated power command value−generated power demand value−charge/discharge power deviation upper limit value Δ*Wu*) (6)

The load power command value calculation section 409 then transmits commands to the load control apparatuses 106a and 106b, designating that these perform control to appropriately alter the levels of power supplied to respective electrical loads, i.e., to an extent whereby the (total) load power demand attains the command value of load power (step S111).

FIGS. 16(a) to 16(e) are diagrams for describing the operation in the case in which there is a sudden increase in the electrical load power demand, with this embodiment. When this occurs in the case of the first embodiment, to ensure that the resultant amount of reduction of the power supply voltage will not exceed the voltage decrement limit value Vl, the generated power command value is momentarily increased by only a limited amount (the "reconciliation" amount) during the delay interval before sufficient additional drive torque begins to be supplied from the engine, as illustrated in diagram (b) of FIG. 16. The increase in generated power, at that time, results in a corresponding decrease in the engine speed of rotation, as described above referring to FIG. 12. With the second embodiment, in addition to that operation of the first embodiment, the load power command value calculation section 409 responds to a change in the load power demand by temporarily decreasing the power supplied to the electrical loads, to reduce the difference between the available generated power value and the generated power demand value, until the level of drive torque applied by the engine becomes sufficient.

Figure 16:
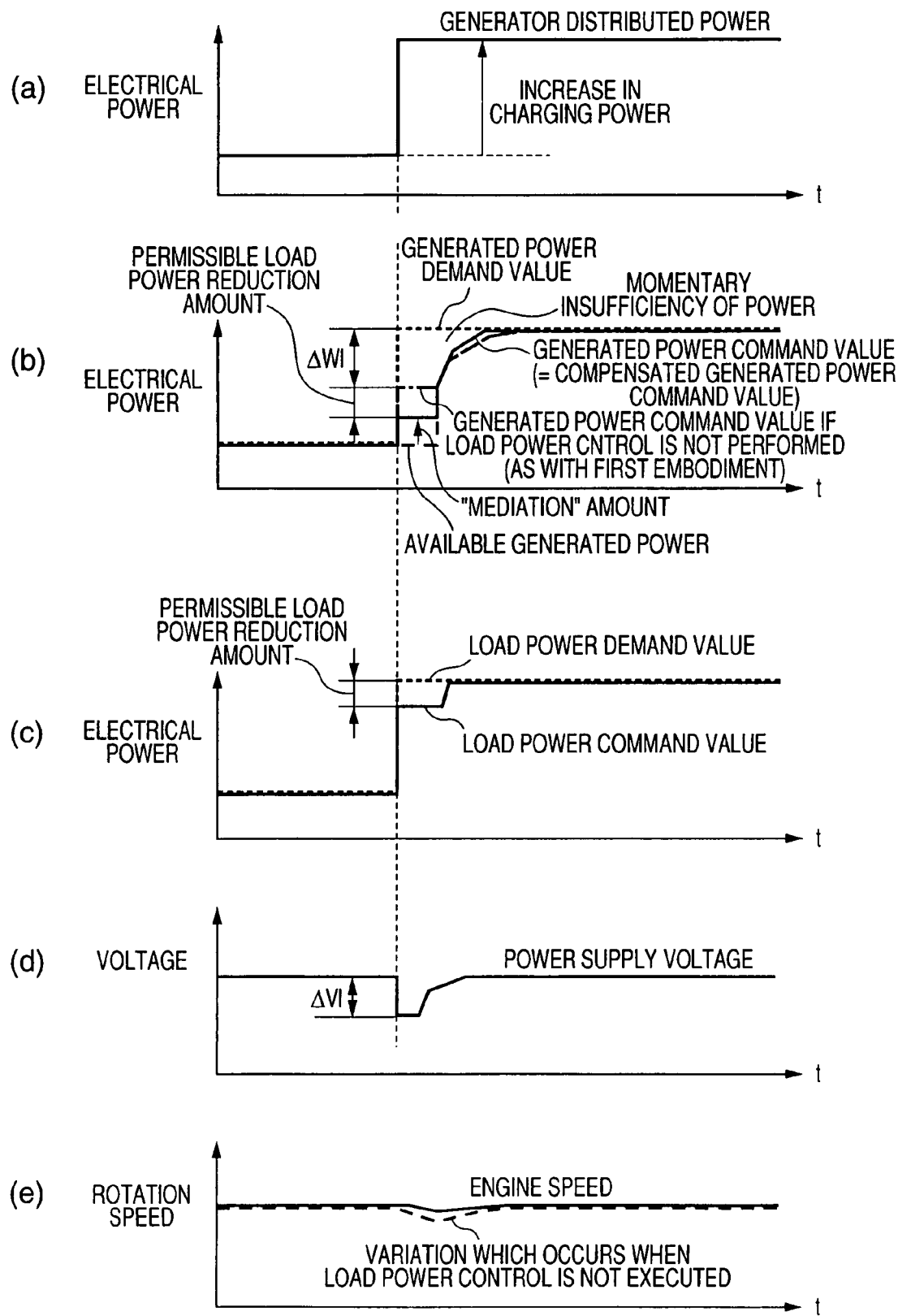
FIG. 16 shows timing diagrams for describing an example of operation when there is a sudden increase in electrical load demand, with the second embodiment.

Hence with this embodiment when for example there is a sudden increase in the load power demand, the amount of momentary increase in the generated power command value ("reconciliation" amount) can be less than in the case of the first embodiment, as illustrated in diagram (b) of FIG. 16. Thus the resultant momentary increase in torque absorbed by the generator 102, and consequent momentary lowering of the engine speed, can be reduced by comparison with the first embodiment, as illustrated in diagram (e) of FIG. 16.

This is achieved while limiting the amount of change in power supplied to the loads 107a, 107b, as illustrated in diagram (c) of FIG. 16(c, to an extent whereby no problem or annoyance will be caused for the vehicle driver (e.g., due to flickering of the headlamps, etc.), while the amount of momentary lowering of the supply lvoltage is limited to be no greater than the voltage decrement limit value ΔVl, as illustrated in diagram (d) of FIG. 16.

As can be understood from the above, with the second embodiment, when there is a change in the level of electrical load and a consequent change in the generated power demand value, then as described for the first embodiment, a demand value of torque is calculated that corresponds to the generated power demand value and data expressing that torque demand value are transmitted to the engine control apparatus 103. The engine 101 is thereby controlled to initiate an operating condition whereby the calculated demand value of torque will be produced, in addition to the torque required to drive the vehicle.

Since the engine cannot respond immediately, the ECU 103 at that time calculates an estimated available value of torque that can currently be provided for driving the generator 102, and data expressing the available value of torque are transmitted to the power supply control apparatus 105.

The power supply control apparatus 105 responds by calculating an available value of generated electrical power, corresponding to the available value of torque, then calculating the difference between the available value of generated electrical power and the generated power demand value.

The command value of generated power is then adjusted to bring the difference between the available value of generated electrical power and the generated power demand value within a range extending between a first limit value and a second limit value, where the first limit value is the sum of the charge/discharge power deviation lower limit value ΔWl and the predetermined maximum allowable decrease in the load power, and the second limit value is the sum of the charge/discharge power deviation upper limit value ΔWu and the predetermined maximum allowable increase in the load power.

Figure 17:
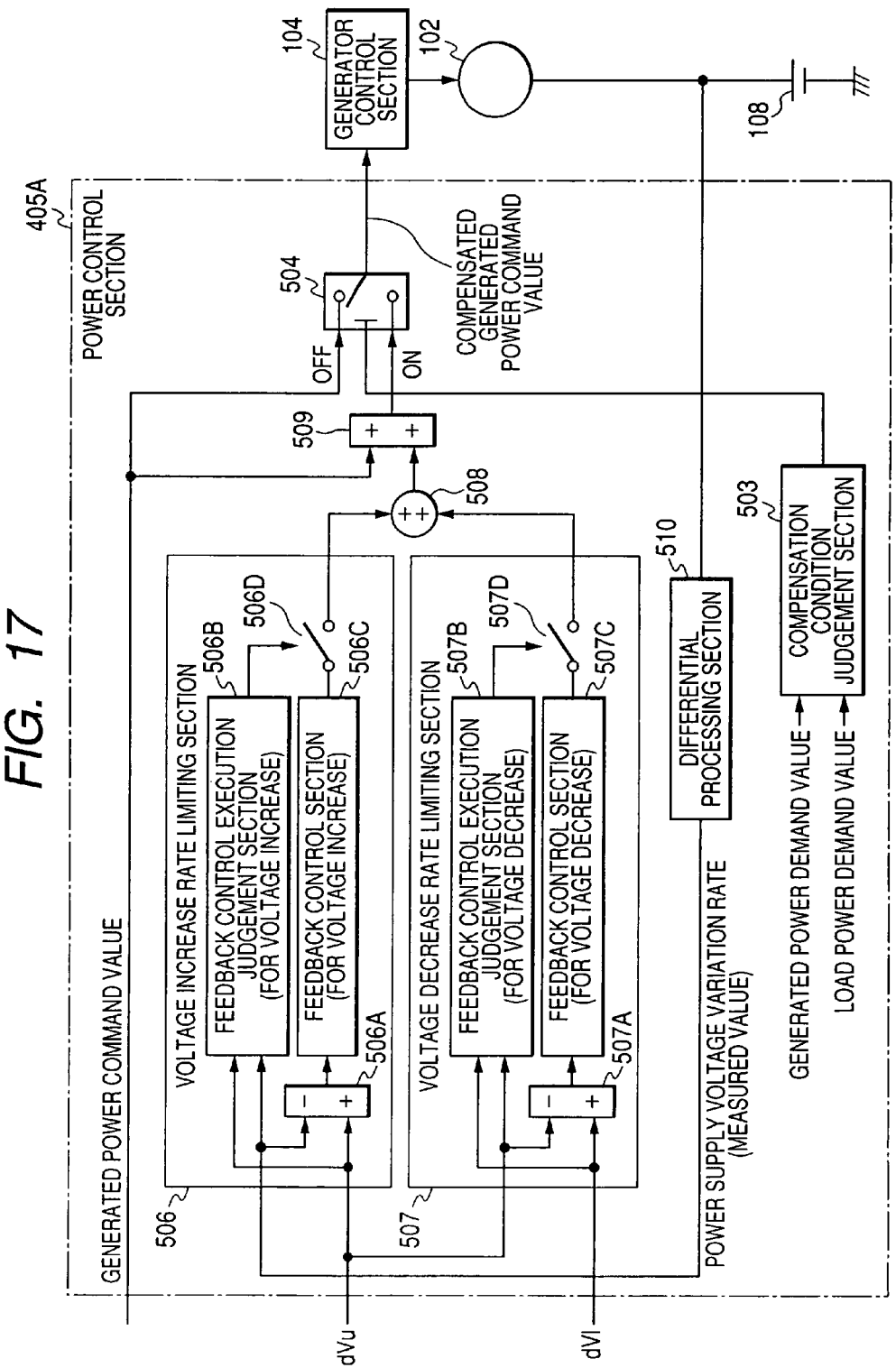
FIG. 17 is a diagram showing a power supply compensation section utilized in a third embodiment of a vehicle-use power supply system.

FIG. 17 shows details of a power compensation section 405A of a third embodiment of a vehicle-use power supply system. The third embodiment differs from the first embodiment shown in FIG. 2 only in that the power compensation section 405 is replaced by the power compensation section 405A.

As shown in FIG. 17, the power compensation section 405A includes a generated voltage compensation execution judgement section 503, a switch 504, a voltage increase rate limiting section 506, a voltage decrease rate limiting section 507, an addition section 508, an addition section 509 and a differential processing section 510. In the same way as for the first embodiment, the generated voltage compensation execution judgement section 503 judges (based on the generated power demand value and the load power demand value) whether a change in the generated power demand has occurred due to a change in the charge/discharge power level while the load power demand remains unchanged. If there is no such change, the switch 504 is set to the OFF side, so that the generated power command value is left unchanged at a precedingly derived value (i.e., derived in the preceding execution of the operation sequence of FIG. 14). However if it is found that there is a change in the generated electrical power due to a change in the charge/discharge power level, then the switch 504 is switched to the ON side. In that case, feedback compensation is applied using the voltage increase rate limiting section 506 and the voltage decrease rate limiting section 507, to set a compensated generated power command value.

The rate of variation of the power supply voltage is detected by the differential processing section 510, and the detected value is supplied to the voltage increase rate limiting section 506 and the voltage decrease rate limiting section 507. When the power supply voltage is increasing, that condition is detected by a feedback control execution judgement section 506B within the voltage increase rate limiting section 506, and the voltage increase rate limiting section 506 responds if necessary by applying compensation to the generated power command value to modify the rate of increase of the power supply voltage, to hold that rate at the voltage increase rate limit dVu.

As shown in FIG. 17, the voltage increase rate limiting section 506 is made up of a subtracter section 506A the feedback control execution judgement section 506B, a feedback control section 506C and a switch 506D. When the feedback control execution judgement section 506B judges (as described hereinafter) that the power supply voltage is increasing at a rate whereby feedback control must be applied, it closes the switch 506D. The combination of the subtracter section 506A and feedback control section 506c operates to compare the detected rate of increase of the power supply voltage with the voltage increase rate limit dVu, and applies feedback compensation of the generated power command value to control the rate of increase of the supply voltage.

Specifically, based on the difference between the rate of increase of the power supply voltage and the voltage increase rate limit dVu, the feedback control section 506C derives a feedback compensation value, that is added to the generated power command value for thereby modifying the rate of increase of the power supply voltage. The feedback compensation value is transferred through the switch 506D and the addition section 508, to be inputted to the addition section 509 and added to the generated power command value. In that way the difference output from the subtracter section 506A becomes reduced to zero, so that the rate of increase of the power supply voltage is held at the limit value dVu.

When the power supply voltage is decreasing, the voltage decrease rate limiting section 507 applies compensation to the generated power command value such that the rate of decrease of the power supply voltage will not exceed the voltage decrease rate limit dVl. As shown in FIG. 17, the voltage decrease rate limiting section 507 is made up of a subtracter section 507A a feedback control execution judgement section 507B, a feedback control section 507C and a switch 507D. When it is judged by the feedback control execution judgement section 507B that feedback control is to be applied by the voltage decrease rate limiting section 507, the switch 507D is closed, and feedback compensation of the generated power command value is such as to cause the rate of decrease of the supply voltage to become equal to the voltage decrease rate limit dVl, i.e., with the difference output from the subtracter section 507A becoming reduced to zero, as described for the voltage increase rate limiting section 506. A feedback compensation amount obtained by the feedback control section 507C is transferred through the feedback control section 507C and addition section 508, to be added to the command value of generated power by the addition section 509.

Figure 18:
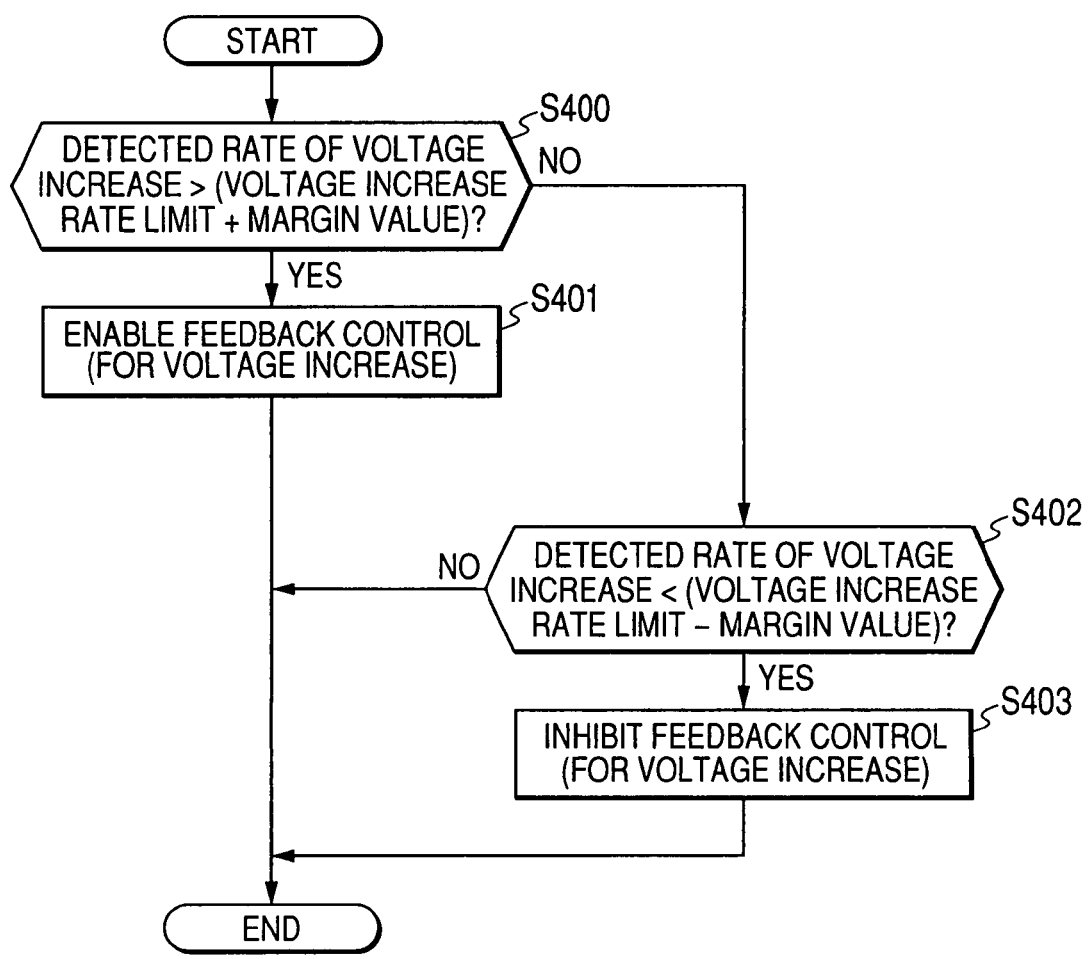
FIG. 18 is a diagram showing an operation sequence performed by a feedback control execution judgement section of the third embodiment.

FIG. 18 is a flow diagram showing an operation sequence that is repetitively executed by the feedback control execution judgement section 506B for judging whether feedback control is to be applied to counteract an excessive rate of increase of the power supply voltage. Firstly, a decision is made as to whether the rate of increase (detected by the differential processing section 510) is greater than a first threshold value, which is the sum of the voltage increase rate limit dVu and a predetermined first value (step S400). If it is judged that the rate of increase is greater than this first threshold value, the feedback control execution judgement section 506B sets the switch 506D to the ON state, thereby enabling the output of the feedback control section 506C to be transferred to the addition section 508 and so enabling feedback control to be applied (step S401).

If it is judged in step S400 that the rate of increase of the power supply voltage is not higher than the first limit, then the feedback control execution judgement section 506B judges whether the rate of increase is less than a second threshold value (step S402). The second threshold value is obtained by subtracting a predetermined second value from the voltage increase rate limit dVu. If the rate of increase is less than the second threshold value (a YES decision in step S402) the feedback control execution judgement section 506B sets the switch 506D to the OFF state, so that feedback control is halted.

If the rate of increase is judged to be between the first and second threshold values (i.e., a NO decision in step S402) then the existing condition of the switch 506D is left unchanged.

The first predetermined value is a maximum margin value, which is the maximum amount by which the rate of increase is allowed to exceed the voltage increase rate limit dVu. The second predetermined value is set such that if the rate of increase is between the first and second threshold values, then that rate of increase is sufficiently close to the voltage increase rate limit dVu, so that feedback control is not necessary.

The voltage decrease rate limiting section 507 operates in a similar manner, with only the direction of voltage change being different from that of the case of the voltage increase rate limiting section 506.

Thus with this embodiment as for the first embodiment, even if there is an error in the charge/discharge power increase rate limit dWu or power decrease rate limit dWl, resulting in a rate of change of the power supply voltage that is outside a range that is defined by the limit values dVu and dVl, compensation is applied to hold the rate of change of voltage within that range.

Fourth Embodiment

Figure 19:
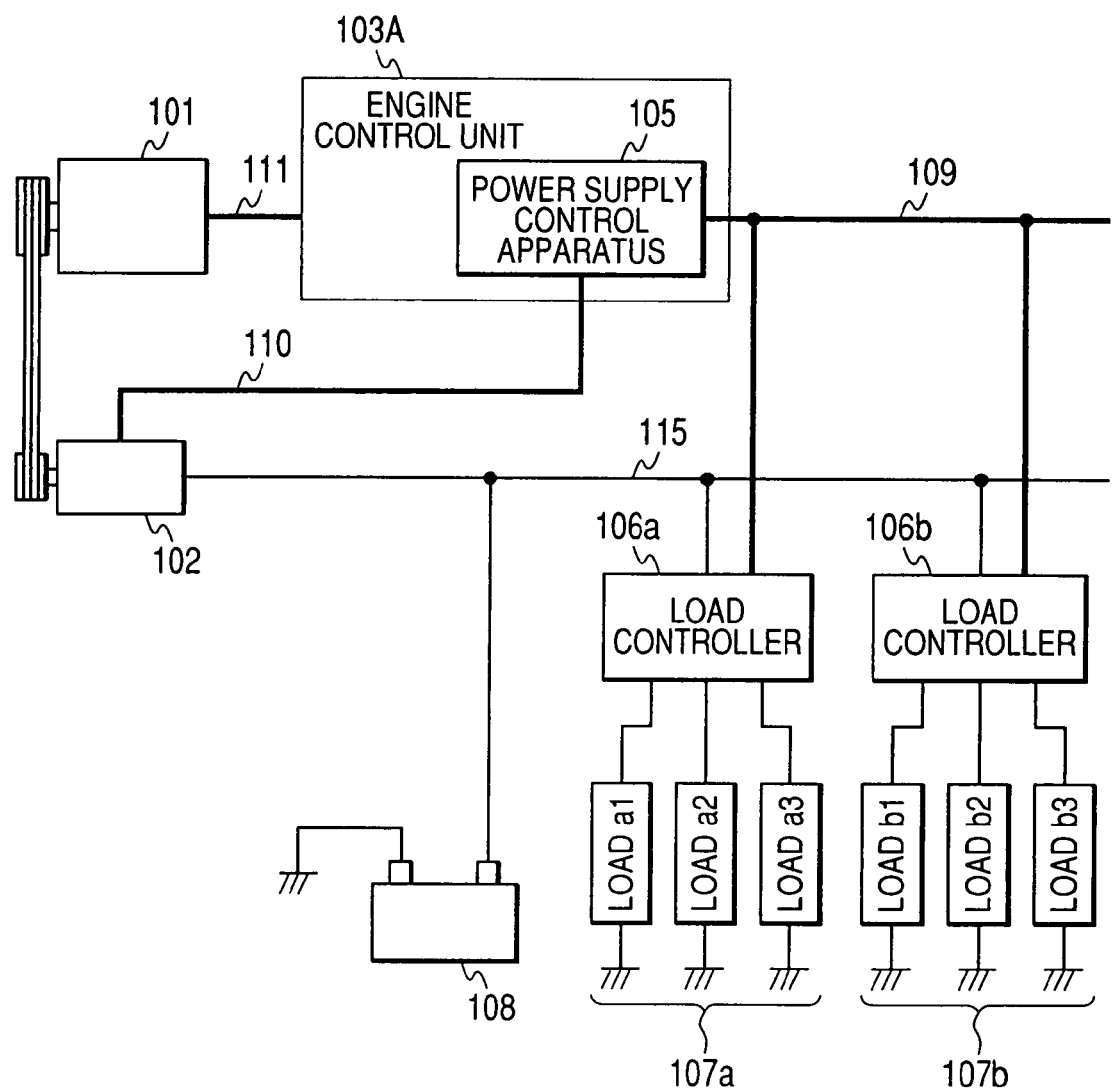
FIG. 19 shows the overall configuration of a fourth embodiment of a vehicle-use power supply system; and, FIG. 20 shows the configuration of an engine control unit in the fourth embodiment.
Figure 20:
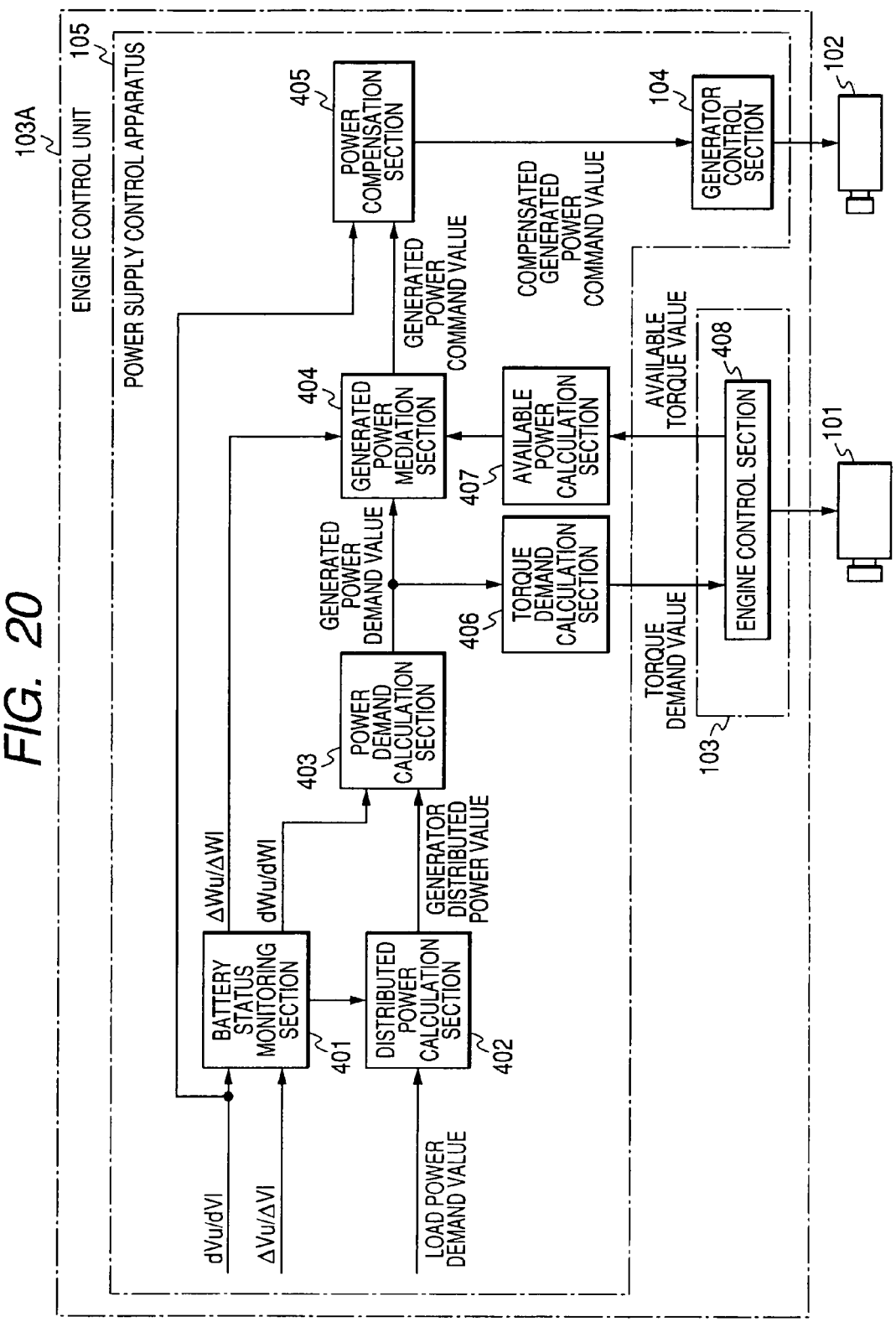

With the above embodiments, the ECU 103 and the power supply control apparatus 105 are connected by the communication line 112. However with a fourth embodiment as shown in FIGS. 19 and 20, the power supply control apparatus 105 is implemented within an ECU 103A. This provides the advantages that when control of the engine 101 and of the generator 102 is executed by the same microcomputer (or microcomputers), a common memory can be utilized, so that data communication between the engine control section 408 and the power supply control apparatus 105 can be performed at high speed. Improved synchronization can thereby be achieved between the level of torque being applied by the engine 101 to drive the generator 102 and the level of torque that is actually being absorbed by the generator 102.

It should be noted that as an alternative to the above, it would be equally possible to incorporate the engine control unit within the power supply control apparatus, or to incorporate both the engine control unit and the power supply control apparatus within some other equipment unit of the vehicle.

It should also be noted that although the invention has been described referring to specific embodiments, various modifications or combinations of the embodiments could be envisaged, which fall within the scope claimed for the invention.

Furthermore although the invention has been described as applied to an electric generator that is mounted in a vehicle and driven by the vehicle engine, it will be apparent that the principles described are applicable in general to the control of engine-driven electric generators.

What is claimed is:

1. A vehicle-use power supply system comprising
   a battery for supplying electrical power to an electrical load via a power supply bus, an electric generator for supplying electrical power via said bus to said battery and said electrical load, and a power supply control apparatus for controlling a value of generated power of said electric generator;
   wherein said power supply control apparatus comprises circuitry adapted to set said generated electrical power at a value that is determined based upon a first range and a second range, where said first range is a range of values of charge/discharge power of said battery whereby a power supply voltage appearing on said bus is held within a predetermined permissible range of voltages, and where said second range is a range of values of rate of change of said charge/discharge power whereby a rate of variation of said power supply voltage is held within a predetermined permissible range of variation rates.

2. A vehicle-use power supply system according to claim 1, wherein said circuitry of the power supply control apparatus is adapted to set a rate of variation of said charge/discharge power at a value within said second range while maintaining said charge/discharge power within said first range.

3. A vehicle-use power supply system according to claim 1, wherein values defining said second range are calculated based upon, in combination, a value of internal resistance of said battery, a detected value of said power supply voltage, and a detected magnitude and direction of current flow of said battery.

4. A vehicle-use power supply system according to claim 1, wherein said electric generator is driven by an internal combustion engine and said system comprises an engine control apparatus for controlling said engine, and wherein said circuitry of the power supply control apparatus is adapted to
   derive a generator distributed power value as a level of power to be currently generated by said electric generator, based upon factors including a status of said electrical load and a state of charge of said battery,
   apply an adjustment to said generator distributed power value to obtain an adjusted distributed power value for maintaining said rate of variation of the charge/discharge power of the battery within said permissible range of charge/discharge power variation rates, and set said adjusted distributed power value as a generated power demand value, and
   transmit data to said engine control apparatus expressing a demand value of torque to be produced by said engine for driving said electric generator to generate said generated power demand value;
   said engine control apparatus comprises circuitry adapted to
   control said engine to initiate an engine operating condition whereby said demand value of torque will be produced,
   calculate an available value of torque that can currently be provided by said engine for driving said electric generator, with said calculation being based upon factors including a control response delay of said engine, and
   transmit data expressing said available value of torque to said power supply control apparatus;
   and wherein said circuitry of the power supply control apparatus is adapted to set a command value of generated power whereby an amount of torque absorbed by said electric generator will correspond to said available value of torque, and to control said electric generator to produce said command value of generated power.

5. A vehicle-use power supply system according to claim 4, wherein said circuitry of the power supply system is adapted to
   express said available value of torque as an available value of generated power,
   detect a difference between said available value of generated power and said generated power demand value, and
   adjust said command value of generated power to reduce said difference.

6. A vehicle-use power supply system according to claim 5, wherein said circuitry of the power supply system is adapted to
   calculate a charge/discharge power deviation upper limit value expressing an amount of increase in said charge/discharge power that will result in a predetermined limit value of increase in said power supply voltage, and a charge/discharge power deviation lower limit value expressing an amount of decrease in said charge/discharge power that will result in a predetermined limit value of decrease in said power supply voltage,
   when said difference represents an insufficiency of generated power, set said command value of generated power to differ from said generated power demand value by an amount no greater than said charge/discharge power deviation lower limit value, and
   when said difference represents an excess of generated power, set said command value of generated power to differ from said generated power demand value by an amount no greater than said charge/discharge power deviation upper limit value.

7. A vehicle-use power supply system according to claim 1, wherein said circuitry of the power supply control apparatus is adapted to
   detect a condition in which said charge/discharge power level is changing, and, when said condition is detected,
   apply compensation to said generated power command value by feedback control to maintain said rate of variation of said power supply voltage within said permissible range of voltage variation rate.

8. A vehicle-use power supply system according to claim 5, wherein said circuitry of the power supply control apparatus is adapted to apply said compensation by performing feedback control of said rate of variation of the power supply voltage, by repetitively executing a sequence of operations to:

detect respective values of said generated power and said power supply voltage, calculate a power difference between said command value of generated power and said detected generated power value, calculate a command value of said power supply voltage based on said power difference, while limiting a rate of change of successively calculated ones of said command values of power supply voltage to be within said permissible range of voltage variation rate, obtain a voltage difference between said command value of power supply voltage and said detected value of power supply voltage, calculate a compensated command value of generated power based on said voltage difference, and control said electric generator to generate said compensated command value of generated power.

9. A vehicle-use power supply system according to claim 5, wherein said circuitry of the power supply control apparatus is adapted to apply said compensation of the generated power command value by repetitively executing a sequence of operations to:

detect said rate of variation of the power supply voltage and the direction of said variation, when said power supply voltage is detected as increasing at a higher rate than a predetermined first threshold value, obtain a difference between the rate of increase and a predetermined permissible rate of increase of said power supply voltage, and apply said compensation to the generated power command value based on said difference; and when said power supply voltage is detected as decreasing at a higher rate than a predetermined second threshold value, obtain a difference between the rate of decrease and a predetermined permissible rate of decrease of said power supply voltage, and apply said compensation to the generated power command value based on said difference.

10. A vehicle-use power supply system comprising a battery for supplying electrical power to a load via a power supply bus, an electric generator for supplying electrical power via said bus to said battery and said load, and an electrical power control apparatus for controlling a value of electrical power generated by said electric generator;

wherein said electrical power control apparatus comprises circuitry adapted to set at least one of said value of generated electrical power and a level of load power that is consumed by said electrical load based upon a first range of values and a second range of values, said first range being a range of values of charge/discharge power of said battery whereby a power supply voltage appearing on said bus is held within a predetermined permissible range of voltages, and said second range being a range of variation of said charge/discharge power whereby an amount of momentary variation of said power supply voltage is held within a predetermined permissible range of voltages, when said momentary variation occurs due to a delay in adjusting said electrical power value.

11. A vehicle-use power supply system according to claim 10, wherein said delay results from a delay in altering a drive torque of said electric generator in response to a requirement for a change in an amount of said electrical power that is supplied to said load.

12. A vehicle-use power supply system according to claim 10, wherein said second range is defined by:

a charge/discharge power deviation lower limit value that is a maximum permissible amount of difference between a demand value of power currently required to be produced by said electric generator and a command value of power that is currently designated to be produced by said electric generator, when said delay is a delay in increasing said drive torque; and a charge/discharge power deviation upper limit value that is a maximum permissible amount of said difference when said delay is a delay in decreasing said drive torque.

13. A vehicle-use power supply system according to claim 12, wherein said electric generator is driven by an internal combustion engine and said system comprises an engine control apparatus for controlling said engine, and wherein said circuitry of the power supply control apparatus is adapted to derive a generator distributed power value as an amount of power required to be currently generated by said electric generator, based upon factors including a condition of said battery and a load power demand value that expresses said amount of electrical power required to be supplied to said electrical load, detect occurrence of a change in said load power demand, set said generator distributed power value as a generated power demand value, and transmit data to said engine control apparatus that express a demand value of torque to be produced by said engine for driving said electric generator to produce said generated power demand value;

said engine control apparatus is adapted to control said engine to initiate an engine operating condition whereby said demand value of torque will be produced, calculate an available value of torque that can currently be provided by said engine to drive said electric generator, with said calculation being based on factors including a control response delay of said engine, and transmit data expressing said available value of torque to said power supply control apparatus;

and wherein when said change in the load power demand is detected, said power supply control apparatus is adapted to calculate an available value of generated electrical power, based on said available value of torque, calculate an amount of deviation in said charge/discharge power as a power difference between said available value of generated electrical power and said generated power demand value, and adjust each of a command value of said generated power and a command value of load power of said electrical load, to bring said amount of deviation within said second range.

14. A vehicle-use power supply system according to claim 13, wherein said adjustment of said command value of generated power reconciles a requirement for reducing an amount of said momentary variation of said power supply voltage and a requirement for reducing a momentary variation of rotation speed of said engine, when said momentary variations occur as a result of said change in load power demand.

15. A vehicle-use power supply system according to claim 14, wherein when said power difference represents an insufficiency of generated power, said command value of generated power is adjusted to become the sum of said available value of generated power and the smaller one of a first value and second value, where said first value is said power difference and said second value is the sum of said currently available value of generated power and a result obtained by subtracting said charge/discharge power deviation lower limit value from said difference, and when said power difference represents an excess of generated power, said command value of generated power is adjusted to become the sum of said available value of generated power and the smaller one of a third value and fourth value, where said third value is said power difference and said fourth value is the sum of said currently available value of generated power and a result obtained by adding said power difference to said charge/discharge power deviation upper limit value.

16. A vehicle-use power supply system according to claim 10, wherein said electric generator is driven by an internal combustion engine and said system comprises an engine control apparatus for controlling said engine, and wherein said circuitry of the power supply control apparatus is adapted to derive a generator distributed power value as an appropriate level of power to be currently generated by said electric generator, based upon factors including a status of said electrical load and a level of charge of said battery, detect a change in said load power demand, set said generator distributed power value as a generated power demand value, and transmit to said engine control apparatus data expressing a demand value of torque to be produced by said engine for driving said electric generator to produce said generated power demand value;

said engine control apparatus comprises circuitry adapted to control said engine to initiate an engine operating condition whereby said demand value of torque will be produced, calculate an available value of torque that can currently be produced by said engine, with said calculation being based on factors including a control response delay of said engine, and transmit data expressing said available value of torque to said power supply control apparatus;

and wherein when said change in the load power demand is detected, said circuitry of the power supply control apparatus is adapted to calculate an available value of generated electrical power corresponding to said available value of torque, calculate an amount of momentary deviation in said charge/discharge power as a difference between said available value of generated electrical power and said generated power demand value, and adjust each of a command value of switched generated power and a command value of load power of said electrical load, to bring said amount of deviation within said second range.

17. A vehicle-use power supply system according to claim 16, wherein said adjustment of the command value of load power is limited to a range between a predetermined maximum permissible amount of temporary reduction in said load power and a predetermined maximum permissible amount of temporary increase in said load power.

18. A vehicle-use power supply system according to claim 17, wherein when said change in the load power demand is judged to be an increase, said adjustment of the command value of load power is performed by subtracting, from said demand value of load power, the smaller one of said maximum permissible amount of reduction in load power and a value that is the difference between a generated power deficit amount and said maximum permissible amount of decrease in said charge/discharge power, and when said change in the load power demand is judged to be a decrease, said setting of the command value of load power is performed by adding to said demand value of load power the smaller one of said maximum permissible amount of increase in load power and a value that is the difference between a generated power excess amount and said maximum permissible amount of increase in said charge/discharge power.

19. A vehicle-use power supply system according to claim 10, wherein values defining said second range are calculated based upon a value of internal resistance of said battery and upon a currently detected value of said power supply voltage and a currently detected magnitude and direction of current flow of said battery.

20. A vehicle-use power supply system according to claim 4, wherein said engine control apparatus and said power converter apparatus are incorporated within a single apparatus unit.

* * * * *